(12) United States Patent
Takeuchi et al.

(10) Patent No.: US 9,383,994 B2
(45) Date of Patent: Jul. 5, 2016

(54) CO-PROCESSOR FOR COMPLEX ARITHMETIC PROCESSING, AND PROCESSOR SYSTEM

(75) Inventors: Toshiki Takeuchi, Tokyo (JP); Hiroyuki Igura, Tokyo (JP)

(73) Assignee: NEC CORPORATION, Tokyo (JP)

(*) Notice: Subject to any disclaimer, the term of this patent is extended or adjusted under 35 U.S.C. 154(b) by 391 days.

(21) Appl. No.: 13/982,526

(22) PCT Filed: Sep. 15, 2011

(86) PCT No.: PCT/JP2011/005222
§ 371 (c)(1),
(2), (4) Date: Jul. 30, 2013

(87) PCT Pub. No.: WO2012/111053
PCT Pub. Date: Aug. 23, 2012

(65) Prior Publication Data
US 2013/0318329 A1    Nov. 28, 2013

(30) Foreign Application Priority Data

Feb. 15, 2011    (JP) .................................. 2011-029325

(51) Int. Cl.
*G06F 9/00* (2006.01)
*G06F 9/30* (2006.01)
*G06F 7/48* (2006.01)
(Continued)

(52) U.S. Cl.
CPC ............ *G06F 9/3001* (2013.01); *G06F 7/4806* (2013.01); *G06F 9/3013* (2013.01); *G06F 9/30145* (2013.01); *G06F 9/3877* (2013.01); *G06F 7/57* (2013.01); *H04B 1/7115* (2013.01)

(58) Field of Classification Search
CPC ................................. G06F 7/57; G06F 9/3877
See application file for complete search history.

(56) References Cited

U.S. PATENT DOCUMENTS

2005/0001684 A1*  1/2005  Braithwaite .......... H03F 1/3247
330/263

FOREIGN PATENT DOCUMENTS

JP        H01-116730 A      5/1989
JP        H10282201 A      10/1998
(Continued)

OTHER PUBLICATIONS

Hiroyuki Ikura, "An 800MOPS, 110mW, 1.5V, Parallel DSP for Mobile Multimedia Processing", Proceedings of the 1998 IEICE General Conference, Mar. 6, 1998, p. 141. Concise English explanation is provided in ISR.

(Continued)

*Primary Examiner* — Zachary K Huson

(57) ABSTRACT

In order to enable to quickly and efficiently execute, by one system, various modulation/demodulation/synchronous processes in a plurality of radio communication methods, a co-processor (22) for complex arithmetic processing, which forms a processor system (100), includes a complex arithmetic circuit (22) that executes for complex data a complex arithmetic operation required for radio communication in accordance with an instruction from a primary processor (10), and a memory controller (20, 21) that operates in parallel with the complex arithmetic circuit and accesses a memory. A trace circuit provided in the complex arithmetic circuit (22) monitors arithmetic result data for first complex data series sequentially read from the memory, and detects a normalization coefficient for normalizing the arithmetic result data.

10 Claims, 18 Drawing Sheets

(51) Int. Cl.
*G06F 9/38* (2006.01)
*G06F 7/57* (2006.01)
*H04B 1/7115* (2011.01)

(56) References Cited

FOREIGN PATENT DOCUMENTS

| JP | 2002208878 A | 7/2002 |
|---|---|---|
| JP | 2003-016051 A | 1/2003 |
| JP | 2003-018081 A | 1/2003 |
| JP | 2005-510170 A | 4/2005 |
| JP | 2006-262322 A | 9/2006 |
| JP | 2009-505608 A | 2/2009 |

OTHER PUBLICATIONS

International Search Report for PCT Application No. PCT/JP2011/005222 mailed on Nov. 15, 2011.
Japanese Office Action for JP Application No. 2012-557668 mailed on Dec. 1, 2015 with English Translation.

* cited by examiner

23

| 31 | 0 |
|---|---|
| CR0 (ZERO) | |
| CR1 (PG) | |
| CR2 (LM) | |
| CR3 (SM) | |
| CR4 (LMP) | |
| CR5 (SMP) | |
| CR6 (TRC) | |
| CR7 | |
| CR8 | |
| CR9 | |
| CR10 | |
| CR11 | |
| CR12 | |
| CR13 | |
| CR14 | |
| CR15 | |

Fig. 3A

Register Format (Complex data assignment)

| 31 30 29 28 27 26 25 24 23 22 21 20 19 18 17 16 | 15 14 13 12 11 10 9 8 7 6 5 4 3 2 1 0 |
|---|---|
| S  Im | S  Re |

Fig. 3B

```
0: CRd = CRs + CRt
1: CRd = CRs - CRt
2: CRd = CRs * CRt
3: CRd += CRs * CRt
4: CRd = CRs + conj(CRt)
5: CRd = CRs - conj(CRt)
6: CRd = CRs * conj(CRt)
7: CRd += CRs * conj(CRt)
8: CRd = absolute(CRs)
9: CRd = round(CRs, imm)
A: CRd = CRs << imm
B: CRd = CRs >> imm
C: ......
D: ......
```

```
op  = Operation code
CRd = Destination Register (CR0-CR15)
CRs = Source Register (CR0-CR15)
CPs = Parameter Register (CP0-CP15)
imm = Immediate value (1-32)
```

| 31 30 29 28 27 26 25 24 23 22 21 20 19 18 17 16 |
|---|
| Fixed value (Co-processor Inst.) | 11 | CPs / imm / CRt |

| 15 14 13 12 | 11 10 9 8 | 7 6 5 4 | 3 2 1 0 |
|---|---|---|---|
| op | Fixed value | CRs | CRd | imm
```
0: 32
1: 1
2: 2
......
A: 10
B: 11
C: 12
......
1E: 30
1F: 31
```

CPs
```
0: cp0
1: cp1
2: cp2
3: cp3
4: cp4
5: cp5
6: cp6
......
E: cp14
F: cp15
```

CRd, CRs, CRt
```
0: CR0
1: CR1
2: CR2
3: CR3
4: CR4
5: CR5
6: CR6
......
E: CR14
F: CR15
``` op
```
0: CADD
1: CSUB
2: CMUL
3: CMAC
4: CJADD
5: CJSUB
6: CJMUL
7: CJMAC
8: CABS
9: CRND
A: CSHL
B: CSHR
C: ......
D: ......
```

Fig. 4

CO-PROCESSOR FOR COMPLEX ARITHMETIC PROCESSING, AND PROCESSOR SYSTEM

This application is a National Stage Entry of PCT/JP2011/005222filed Sep. 15, 2011, which claims priority from Japanese Patent Application 2011-029325 filed Feb. 15, 2011, the contents of all of which are incorporated herein by reference, in their entirety.

TECHNICAL FIELD

The present invention relates to a co-processor for complex arithmetic processing and a processor system. In particular, the present invention relates to a technique to execute various complex arithmetic processes required for radio communication.

BACKGROUND ART

In a radio communication system, it is generally required to perform modulation/demodulation for transmitted and received data. In other words, it is necessary at the transmitting side to perform, for data signals to be transmitted, modulation such as PSK (Phase Shift Keying, e.g., BPSK (Binary PSK), QPSK (Quadrature PSK) or 8PSK) or QAM (Quadrature Amplitude Modulation, e.g., 16QAM, 64QAM or 256QAM), spreading, and the like. On the other hand, it is necessary at the receiving side to perform, for received data signals, synchronous processing, demodulation, despreading, and the like.

These processes are intended mainly for radio symbol units (complex IQ signals), and thus it is required to execute a large number of complex arithmetic processes (complex multiplication, complex addition and the like). Further, upon the demodulation, the dynamic range of arithmetic-processing data broadens out beyond the necessity. Therefore, it is also necessary at the intermediate stage of processing to streamline the processing, for example, by normalizing the result of complex arithmetic operation for each piece of data and then performing the next arithmetic operation.

Conventionally, there has been adopted a technique to implement a dedicated hardware circuit for each process in order to be compatible with modulation/demodulation and synchronous processing in a single radio communication method at high speed and low power consumption. For example, PTL 1 discloses a dedicated circuit which calculates, upon RAKE synthesis, a normalization coefficient by using a plurality of channel estimate values.

Further, expectations have been recently raised for software radio technologies which can cope with a plurality of radio methods by one system. However, contents of modulation/demodulation/synchronous processing have the characteristic of basically differing from one to another between various radio communication methods which have been standardized, while being partially similar to each other.

Accordingly, in a case of using the conventional technique where the dedicated hardware circuit is implemented for each radio communication method in order to cope with modulation/demodulation/synchronous processing in a plurality of radio communication methods in a simple manner, it requires a plurality of dedicated hardware circuits corresponding to the number of adopted radio communication methods. Therefore, there is a problem that the space overhead of circuits is very high. Further, there is also a problem that the flexibility for modification or extension of processing is low.

There have been already proposed first and second related arts for addressing the above-mentioned problems. Hereinafter, these first and second related arts will be described one by one.

[First Related Art]

PTL 2 discloses a technique to make a dedicated hardware circuit compatible with a plurality of radio communication methods, by configuring the dedicated hardware circuit to be able to be set thereto various parameters with the emphasis on high-speed performance and power efficiency. Specifically, a dedicated processing engine, which forms a wireless communication device, is configured to be able to be reset in order that the dedicated processing engine may be compatible with a plurality of baseband processes, so that the dedicated processing engine is made flexibly compatible with a plurality of radio communication methods.

However, in this case, there is a problem that although it is relatively easy to address the change in a part of processing parameters in the arithmetic expression, it is difficult to be compatible with radio communication methods such as CDMA (Code Division Multiple Access) and OFDM (Orthogonal Frequency Division Multiplexing), whose fundamental processing algorithms of demodulation are different from each other.

Further, it is also difficult to be able to modify arithmetic processing data units, the repeat count of arithmetic processing, the detailed order of arithmetic operations, the order of processing between processing engines (dedicated hardware circuits), and the like. Configuring them so as to be able to be modified, there cause a problem of complicating the configuration of connections between dedicated hardware circuits, after all, which leads to an increase in the space overhead, and a problem that it is not possible to address the extension of specifications, which will be expected in the future like change in the order of processing within the processing engine.

Note that as similar techniques, PTLs 3 and 4 each disclose a technique to address system change by making a dedicated co-processor (hardware circuit) capable of being set thereto parameters and by controlling the dedicated co-processor under a processor for control.

However, as with the above-mentioned PTL 2, although it is possible to address changes in a part of processing parameters and the number of parallel processes, or the like, it is merely possible to address the change within a certain fixed range of processes. Therefore, there is a problem that it is difficult to be able to address modifications of the fundamental processing algorithm and the order of arithmetic operations, and the like.

[Second Related Art]

As another related art, PTL 5 discloses a technique to perform software processing by using a signal processing processor (DSP: Digital Signal Processor). Specifically, communication processing is executed by using a typical signal processing processor, a DMA (Direct Memory Access) controller for speeding up memory access and the like, thereby flexibly addressing various signal processes.

However, in modulation/demodulation/synchronous processing for radio communication, it is required to normalize data before and after special arithmetic processing such as complex arithmetic processing (in more detail, to calculate a normalization coefficient and to perform normalization using this coefficient). Therefore, the typical signal processing processor requires processing instructions (arithmetic cycles) more than those required by dedicated hardware which can execute these processes in a pipelined parallel manner, so that there is a problem that the number of processing cycles significantly increases.

Further, although the flexibility for processing modification is ensured, access latency from a processor to a memory leads to the performance overhead, for example. Therefore, after all, there is also a problem that it is difficult to speed up. Even when the DMA controller is used for the memory access, in the case of the software processing by the processor, separate cycles are required for a load/store instruction for the memory and an arithmetic processing instruction. Therefore, the software processing runs at lower speed than the dedicated hardware processing. On the other hand, it is required to raise a clock frequency in the case of increasing the speed, so that there is a problem that the power consumption increases.

CITATION LIST

Patent Literature

PTL 1: Japanese Unexamined Patent Application Publication No. 2003-018081
PTL 2: Published Japanese Translation of PCT International Publication for Patent Application No. 2009-505608
PTL 3: Published Japanese Translation of PCT International Publication for Patent Application No. 2005-510170
PTL 4: Japanese Unexamined Patent Application Publication No. 2006-262322
PTL 5: Japanese Unexamined Patent Application Publication No. H01-116730

SUMMARY OF INVENTION

Technical Problem

The first problem is that in modulation/demodulation/synchronous processing in the radio communication system, it is impossible to be flexibly compatible with various modulation/demodulation/synchronous processes in a plurality of radio communication methods. This is because with respect to contents of modulation/demodulation/synchronous processing, although a part of processes is generally similar between the radio communication methods, the processing algorithm and the order of arithmetic operations basically depend largely on the specifications of each radio communication method, and the required amount of arithmetic operation is also relatively large, so that a dedicated hardware circuit needs to be implemented for each radio communication method.

However, with the improvement in processing performance by the recent increase in the size and speed of system LSI (Large Scale Integration) and the like, it is desired in the future to materializing a radio communication system called multi-mode radio or SDR (Software Defined Radio) where the identical system can be compatible with a plurality of radio communication methods. Moreover, it is important to flexibly address the future change in specifications and function enhancement.

The second problem is that in the case of implementing modulation/demodulation/synchronous processing (complex arithmetic processing) in the radio communication system using the software processing by the processor with the emphasis on the flexibility, the simultaneous execution of the normalization processing and the complex arithmetic processing, which also includes the memory access latency, cannot be performed at high speed. This is because in modulation/demodulation/synchronous processing in radio communication, in order to normalize one piece of data, information on a plurality of data signals before and after that data is generally required, for example. It does not really matter in the case where the dedicated hardware circuit implements the processing in the pipelined parallel manner. However, in the case of implementing the processing using the software processing by the processor with the emphasis on the flexibility, it is difficult for the typical processor to simultaneously execute the normalization processing and the complex arithmetic processing. Further, in the case of processor processing, certain latency (certain number of cycles) is generally required to access the memory. Therefore, there is a serious problem that the operating rate of arithmetic unit falls by the amount of latency, in other words that processing time increases and thus it is not possible to speed up.

The processing amount of modulation/demodulation in radio communication generally depends on a required data transmission rate. The required data transmission rate tends to increase in the recent radio communication method, and therefore it becomes increasingly important to increase the speed with lower power consumption.

The present invention has been accomplished in view of the above-mentioned problems, and an exemplary object of the present invention is to make it possible to quickly and efficiently execute, by one system, various modulation/demodulation/synchronous processes in a plurality of radio communication methods. In other words, the exemplary object of the present is to provide a system achieving both of the high-speed performance and low power consumption performance as implemented by the dedicated hardware circuit, and the flexibility as implemented using the software processing the processor.

Solution to Problem

In order to achieve the above-mentioned object, a co-processor for complex arithmetic processing according to a first exemplary aspect of the present invention includes: a complex arithmetic circuit that executes a complex arithmetic operation for complex data in accordance with an instruction from a main processor, the complex arithmetic operation being required for radio communication; and a memory controller that operates in parallel with the complex arithmetic circuit, and accesses a memory. The complex arithmetic circuit includes a trace circuit that monitors arithmetic result data for first complex data series sequentially read from the memory, and that detects a normalization coefficient for normalizing the arithmetic result data.

Further, a co-processor for complex arithmetic processing according to a second exemplary aspect of the present invention includes: a complex arithmetic circuit that executes a complex arithmetic operation for complex data in accordance with an instruction from a main processor, the complex arithmetic operation being required for radio communication; and a memory controller that operates in parallel with the complex arithmetic circuit, and accesses a memory. The memory controller includes: a first address generator circuit that autonomously generates a write address to the memory; a second address generator circuit that autonomously generates read addresses from the memory; a first FIFO that temporarily stores arithmetic result data obtained by the complex arithmetic circuit, and that outputs the arithmetic result data to the memory in synchronization with the write address; a second FIFO that temporarily stores complex data series input from the memory in synchronization with the read addresses, and that sequentially outputs the complex data series to the complex arithmetic circuit; and a preprocessing circuit that is provided between the memory and the second FIFO, and that normalizes the complex data series by using a predetermined normalization coefficient.

Furthermore, a processor system according to a third exemplary aspect of the present invention includes the co-processor for complex arithmetic processing, and a main processor that controls, by an instruction, the co-processor for complex arithmetic processing.

Advantageous Effects of Invention

According to the present invention, it is possible to quickly and efficiently execute, by one system, various modulation/demodulation/synchronous processes in a plurality of radio communication methods.

BRIEF DESCRIPTION OF DRAWINGS

FIG. 3A is a diagram showing a configuration example of a register file used for the co-processor for complex arithmetic processing according to the first exemplary embodiment of the present invention;

FIG. 3B is a diagram showing a format example of each of registers used for the co-processor for complex arithmetic processing according to the first exemplary embodiment of the present invention;

FIG. 4 is a diagram showing a configuration example of an operation code used for the co-processor for complex arithmetic processing according to the first exemplary embodiment of the present invention;

DESCRIPTION OF EMBODIMENTS

Figure 1:
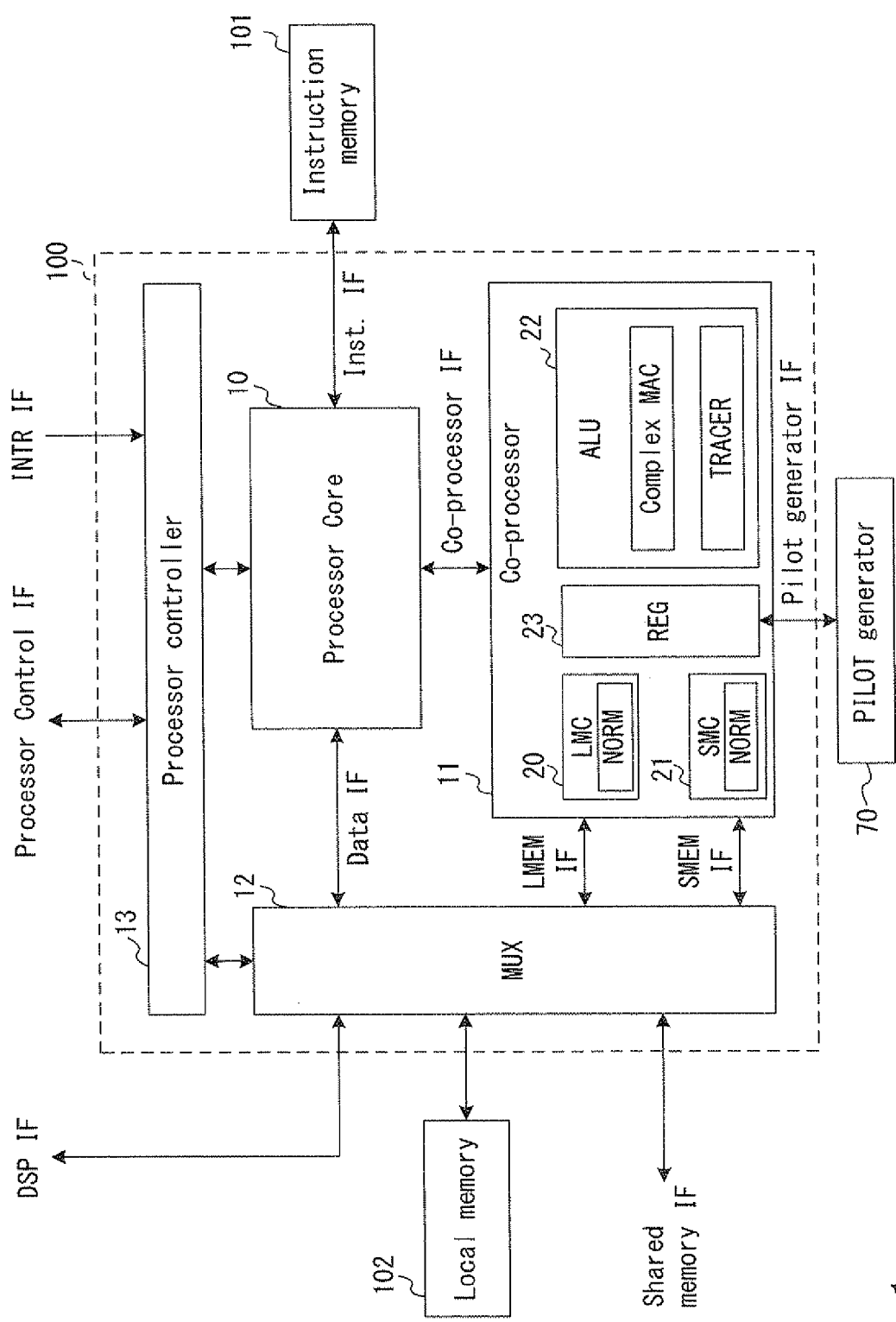
FIG. 1 is a block diagram showing a configuration example of a processor system according to a first exemplary embodiment of the present invention.

Hereinafter, first and second exemplary embodiments of a co-processor for complex arithmetic processing according to the present invention, and a processor system to which this co-processor is applied will be described with reference to FIGS. 1, 2, 3A, 3B, 4 to 10, 11A, 11B, 12 to 15, 16A and 16B. Note that in the drawings, the identical reference symbols denote identical elements and the redundant explanation thereof will be omitted as appropriate to clarify the explanation.

[First Exemplary Embodiment]
[Configuration Example]

As shown in FIG. 1, a processor system 100 according to this exemplary embodiment includes a processor 10 for control (Processor Core), and a co-processor 11 for complex arithmetic processing (hereinafter, sometimes abbreviated as "co-processor") which is connected to the processor 10. The processor system 100 includes, as external interfaces, a processor control interface for performing boot control, input of interrupt signals and the like, an instruction memory interface for accessing an instruction memory 101, a local memory interface for accessing a local memory (data memory) 102, a DSP interface for performing control access to external peripherals (not shown), and a shared memory interface for performing stream access to a shared memory (not shown). Moreover, the processor system 100 also includes a pilot data interface which is used for continuously inputting thereto known pilot signals (reference signals) generated by a pilot generator 70. Note that the instruction memory 101 is connected directly to the instruction memory interface of the processor 10 for control.

As the processor 10 for control, a typical processor for control having co-processor interface (e.g., Harvard architecture-type 32 bits RISC (Reduced Instruction Set Computer) processor) can be used. The processor 10 for control is connected to the co-processor 11 through the co-processor interface. Moreover, the instruction memory 101 is connected directly to the instruction memory interface of the processor 10 for control.

A memory selector (MUX-type bus controller) 12 arbitrates data access from the processor 10 for control, and memory access from the co-processor 11. Note that a processor controller 13 is a block which performs boot control and interruption control from outside, and the like. Access from outside to the local memory 102 and the instruction memory 101 may be configured so as to be performed (bypassed) from outside directly to each memory, or may be performed through the processor control interface.

On the other hand, the co-processor 11 includes a local memory controller (LMC) 20, a shared memory controller (SMC) 21, and an ALU (Arithmetic and Logic Unit) 22 for complex arithmetic operations. Note that in the following explanation, the local memory controller (LMC) and the shared memory controller (SMC) will be sometimes collectively referred to as "memory controller" without being distinguished from each other.

The local memory controller (LMC) 20 and the shared memory controller (SMC) 21 operate in parallel with the ALU 22, thereby hiding the memory access latency. The local memory controller (LMC) 20 can perform stream access (burst access supporting split transactions) to the local memory 102 through the local memory interface (LMEM IF). On the other hand, the shared memory controller (SMC) 21 can perform stream access to the shared memory through the shared memory interface (SMEM IF).

Figure 2:
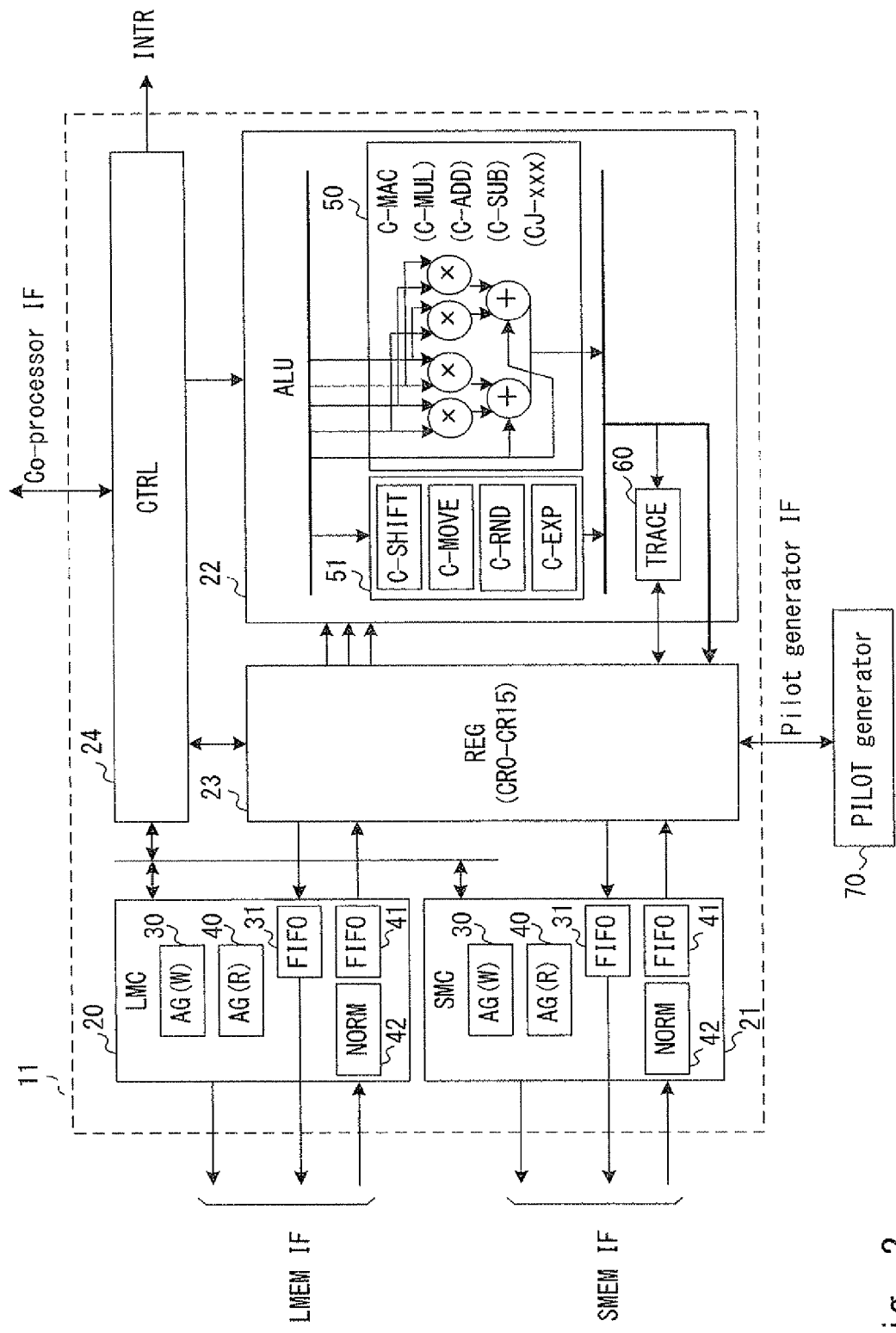
FIG. 2 is a block diagram showing a configuration example of a co-processor for complex arithmetic processing according to the first exemplary embodiment of the present invention.

Specifically, as shown in FIG. 2, each of the memory controllers (LMC, SMC) 20 and 21 includes therein a write address generator 30, a write data FIFO (First-In First-Out) 31, a read address generator 40 and a read data FIFO 41, in order to access each of the local memory and the shared memory in parallel with the arithmetic operations by the ALU 22. The read address generator 40 has a split transaction function of issuing addresses in an anticipated manner upon reading from the memory. Moreover, each of the memory controllers 20 and 21 includes a preprocessing circuit 42 which normalizes data input from the memory.

Note that in the examples shown in FIGS. 1 and 2, two units of memory controllers are implemented. Meanwhile, one memory controller may be implemented, or three or more memory controllers may be implemented.

Further, the ALU 22 includes a complex arithmetic unit 50 and a complex arithmetic-logic unit 51. These units 50 and 51 can be used for modulation for data to be transmitted, demodulation for received data such as channel estimation and equalization, synchronous processing, and the like. Specifically, the complex arithmetic unit 50 executes complex addition (CADD), complex subtraction (CSUB), complex multiplication (CMUL), complex multiply and accumulation (CMAC), complex conjugate addition (CJADD), complex conjugate subtraction (CJSUB), complex conjugate multiplication (CJMUL), complex conjugate multiply and accumulation (CJMAC), complex absolute value operation (CABS) and the like, which are generally used for modulation/demodulation/synchronous processing in a plurality of radio communication methods. On the other hand, the complex arithmetic-logic unit 51 executes complex shifting (CSHIFT), complex rounding (CRND), move instructions, and the like.

Moreover, the ALU 22 also includes a trace circuit 60. The trace circuit 60 monitors results of complex arithmetic operations output from the units 50 and 51 to detect a normalization coefficient. The trace circuit 60 detects, as the normalization coefficient, a maximum significant bit position of one series of continuous data among the results of complex arithmetic operations. The maximum significant bit position is a position where a bit of arithmetic result data which firstly represents "1" in the direction from MSB (Most Significant Bit) except a sign bit.

Furthermore, the co-processor 11 includes a register file (REG) 23 and a controller (CTRL) 24.

The register file (REG) 23 includes a plurality of general registers (different from registers originally provided in the processor 10 for control), which can be used by co-processor instructions. Meanwhile, the provision of register file (REG) 23 is not essential, if a register file in the processor 10 for control can be shared as the register file (REG) 23.

Moreover, the controller 24 decodes the co-processor instructions, and controls the memory controller 20 and 21, the ALU 22, and the register file (REG) 23 in accordance with the result of decode.

[Operation Example]

Next, operations of this exemplary embodiment will be described in detail with reference to FIGS. 1, 2, 3A, 3B, and 4 to 9. Note that in the following explanation, specific configurations of the memory controllers 20 and 21, the ALU 22, and the register file (REG) 23 will be also clearly understood.

Fundamental operations of the processor system 100 are shown in FIG. 1. As shown in the figure, when the processor 10 for control is booted by use of the processor control interface or the interruption interface, the processor 10 fetches operation codes out of the instruction memory 101, and executes processor processing while accessing the local memory (data memory) 102. Moreover, the processor 10 for control also accesses the external shared memory and peripheral blocks.

The processor 10 for control uses co-processor instructions as the operation codes in order to control the co-processor 11 to execute complex arithmetic processing. When the co-processor instruction is fetched, the processor 10 for control executes co-processor processing through the co-processor interface.

At this time, as shown in FIG. 2, the controller 24 in the co-processor 11 decodes the co-processor instruction, and controls the local memory controller (LMC) 20, the shared memory controller (SMC) 21, the ALU 22 and the register file (REG) 23 to execute the decoded co-processor instruction.

[Configuration of General Register File 23 and Operation Based Thereon]

As shown in FIG. 3A, the register file (REG) 23 is composed of 16 units of 32 bits registers CR0 to CR15, for example. The co-processor 11 uses these general registers CR0 to CR15 to execute arithmetic instructions within the co-processor, arithmetic instructions between the processor for control and the co-processor, and the like. Moreover, FIG. 3B shows a bit format in a case where complex data is stored in each register. In this example, a real part (Re) is assigned to lower 16 bits in each register, and an imaginary part (Im) is assigned to higher 16 bits in each register.

Among the general registers CR0 to CR15, some registers operate as special registers.

In the example shown in FIG. 3A, the register CR0 operates as a zero register (to which write access is invalid, and a value obtained by read access is constantly "0").

The registers CR2 and CR3 operate as special registers for memory access. The register CR2 is assigned for accessing the local memory. The register CR3 is assigned for accessing the shared memory. In this case, when the ALU 22 performs write access to the register CR2, data is written to the local memory 102 through the write data FIFO 31 in the local memory controller (LMC) 20. At this time, the write address is an address designated by the write address generator 30 in the local memory controller (LMC) 20.

Thus, the ALU 22 and the controller 24 can execute the next co-processor instruction only by performing the write to the register CR2. Therefore, as a result, the arithmetic result data can be written to the local memory 102 at one [data/cycle] write throughput.

On the other hand, in a case where the read address generator 40 and the like in the local memory controller (LMC) 20 have preliminarily operated and thus read of stream data on the local memory 102 has been started, the ALU 22 can read data on the local memory 102 through the preprocessing circuit 42 and the read data FIFO 41 in the local memory controller (LMC) 20, only by performing read access from the register CR2.

At this time, the data on the local memory 102 has been preliminarily transferred to inside of the local memory controller (LMC) 20. Therefore, the ALU 22 can perform the read access from the register CR2 without waiting. As a result, the ALU 22 can read data intended for arithmetic operations from the local memory 102 at one [data/cycle] read throughput.

Similarly, the ALU 22 performs write access and read access to/from the register CR3, thereby enabling to access the shared memory through the shared memory controller (SMC) 21 while hiding the memory access latency.

Further, another two registers CR4 and CR5 can operate as registers for PEEP processing by setting parameter registers.

As described above, the registers CR2 and CR3 are the ones for accessing the local memory 102 and the shared memory, respectively. When the read access from these registers CR2 and CR3 is performed, the status of read data FIFO 41 is updated.

On the other hand, in the case where the registers CR4 and CR5 operate as the ones for PEEP processing, when the read access from these registers CR4 and CR5 is performed, the same data as that in the register (LM) CR2 can be read from the register (LMP) CR4, and the same data as that in the register (SM) CR3 can be read from the register (SMP) CR5. At this time, the status of read data FIFO 41 is not updated. Accordingly, the data read from the registers CR4 and CR5 can be read again from the registers CR2 and CR3. This PEEP register function is useful in a case of using the same data more than once. In particular, upon modulation/demodulation in various radio methods, there is a possibility of continuously using the same data twice or more times. Therefore, this function is very useful.

Note that it is also possible by the parameter setting to select to use the registers CR4 and CR5 as the PEEP function registers, or to use them as normally general registers.

Further, the register CR1 operates as a special register for accessing pilot signals (reference signals). In this case, if the pilot generator 70 and the like have preliminarily operated, the ALU 22 can sequentially read the pilot signals (reference signals) which are continuously input from the pilot generator 70, only by performing read access from the register CR1.

At this time, the ALU 22 can perform the read access from the register CR1 without waiting. As a result, the ALU 22 can access the continuous pilot signals (reference signals) at one [data/cycle] throughput while hiding the access latency.

Furthermore, the register CR6 operates as a register for storing a result of trace to calculate the normalization coefficient.

This register CR6 operates as a normally general register when a TRACING register in the controller 24 is set with "OFF", but is used for storing the trace result (for cumulative OR processing) to detect the maximum significant bit position (normalization coefficient) of the complex arithmetic result when the TRACING register is set with "ON".

According such configurations, it is possible to use the general registers for accessing the local memory 102, the external shared memory and the pilot signals (reference signals). In other words, stream data access to/from the local memory 102, the external shared memory and the pilot signals (reference signals) can be executed by the instruction mapping and at the number of processing cycles similar to those for the general registers in the co-processor 11.

Note that in FIGS. 3A and 3B, there has been dealt with the case where each register is in 32 bits format, and 16 bits of real part (Re) and 16 bits of imaginary part (Im) are stored as one piece of complex data. Moreover, there has been dealt with the register file configuration composed of 32 bits*16 units of registers. However, the register file (REG) 23 is not limited to such configurations, but may be configured by use of 16 bits or 64 bits registers, or may be configured by use of 8 units or 32 units of registers.

[Configuration of Co-processor Instruction Code and Operation Based Thereon]

FIG. 4 shows a configuration example of the operation code of the co-processor instruction.

CADD meeting OP (Operation Code)="0" is an instruction for the complex addition, and means that the complex addition is performed for data in input registers (CRs, CRt) and that a result of the complex addition should be output to an output register (CRd) (CRd=CRs+CRt). The CRs, CRt and CRd each indicate the general register number in the register file (REG) 23.

Similarly, CSUB meeting OP="1" is an instruction for the complex subtraction. CMUL meeting OP="2" is an instruction for the complex multiplication. CMAC meeting OP="3" is an instruction for the complex multiply and accumulation. Moreover, CJADD meeting OP="4" is an instruction for the complex conjugate addition. CJSUB meeting OP="5" is an instruction for the complex conjugate subtraction. CJMUL meeting OP="6" is an instruction for the complex conjugate multiplication. CJMAC meeting OP="7" is an instruction for the complex conjugate multiply and accumulation. CABS meeting OP="8" is an instruction for the complex absolute value operation. Each of these instructions can be executed at one cycle by implementing in the ALU 22 the complex arithmetic unit 50 which will be described later, although each instruction is an arithmetic operation for which the typical processor takes a plurality of cycles to process one piece of complex data.

CRND meeting OP="9" is an instruction for the complex rounding. CSHL meeting OP="A" is an instruction for the complex shifting to the left (CRd=CRs<<imm). CSHR meeting OP="B" is an instruction for the complex shifting to the right (CRd=CRs>>imm). These instructions, complex Exponent instruction (CEXP) which will be described later, and the like are executed by the complex arithmetic-logic unit 51.

In the example shown in FIG. 4, only the arithmetic instructions within the co-processor are illustrated as an example of a part of the co-processor instructions. However, instructions for arithmetic operations between the processor for control and the co-processor, and instructions for setting parameters for the trace circuit 60 can be also defined other than the illustrated arithmetic instructions, by changing values of fixed bits (bits [22:21] in the example shown in FIG. 4) within the operation code to values other than "11".

As an example of the instructions for arithmetic operations between the processor for control and the co-processor, the target (source) register portion of each instruction using the co-processor register (CRt) in the example shown in FIG. 4 is changed to the general register number (Rt) within the processor 11 for control. Thus, it is possible to execute complex arithmetic operations by using as input both of the co-processor register (CRs) and the general register (Rt) within the processor 11 for control. Moreover, the general registers (Rs, Rd) within the processor 11 for control are designated as input and output registers for a register transfer instruction (CMOVE). Thus, it is possible to define instructions for transfer between the register within the processor for control and the register within the co-processor.

Furthermore, it is also possible by the complex Exponent instruction (CEXP) to define an instruction for calculating the number of sign bits of each of the real part and the imaginary part in the designated co-processor register (CRs), and for storing a result of the calculation in the general register (Rd) within the processor 11 for control. This complex Exponent instruction is the one used upon calculating the normalization coefficient which will be described later.

Note that parameter register setting instructions such as setting instructions for the trace circuit 60 are the ones which can set immediate values or values in the general registers within the processor 11 for control to various parameter registers within the ALU 22, and the memory controllers (LMC, SMC) 20 and 21.

[Configuration and Operation of ALU 22]
[Configuration and Operation of Complex Arithmetic Unit 50]

Figure 5:
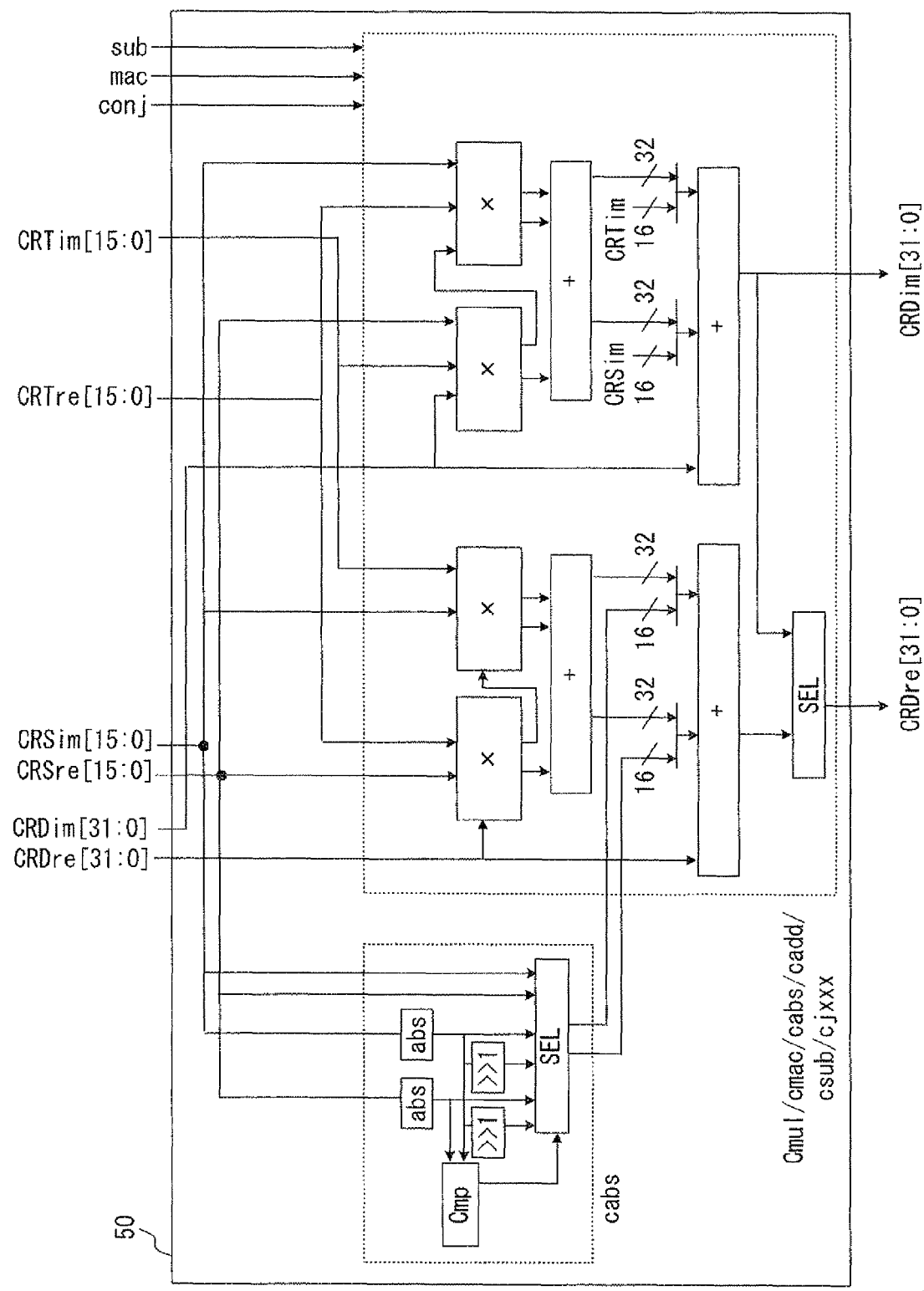
FIG. 5 is a block diagram showing a configuration example of a complex arithmetic unit used for the co-processor for complex arithmetic processing according to the first exemplary embodiment of the present invention.

FIG. 5 shows a configuration example of the complex arithmetic unit 50 in the ALU 22.

The complex arithmetic unit 50 has, as interfaces thereof, input data (CRs, CRt, CRd), output data (CRd) and arithmetic modes (conj, mac, sub).

CRd has both of input and output interfaces for multiply and accumulation (cumulative arithmetic operation). Four units of multipliers and two (or four) units of adders are provided for the complex multiply and accumulation. Thus, in accordance with the arithmetic mode, it is possible to address various complex arithmetic instructions defined in e.g., FIG. 4 at one data/cycle.

In this way, as the configuration and operation of the complex arithmetic unit 50, the operation mode is changed depending on the complex arithmetic instruction to be used, and the complex arithmetic operations are executed. Thus, it is possible to be compatible at one data/cycle in a programmable manner with complex arithmetic processing in modulation/demodulation/synchronous processing in various radio communication methods.

Furthermore, the complex arithmetic instructions are repeatedly executed using a for-loop or the like, while operating the memory controller (LMC, SMC) 20 or 21 (register CR2, CR3 or the like), and the pilot generator 70 (register CR1). Thus, in the circuit configuration shown in FIG. 5, it is possible to execute at one data/cycle throughput complex arithmetic processing for long stream data series stored in the local memory or the shared memory.

[Configuration and Operation of Complex Arithmetic-Logic Unit 51]

Figure 6:
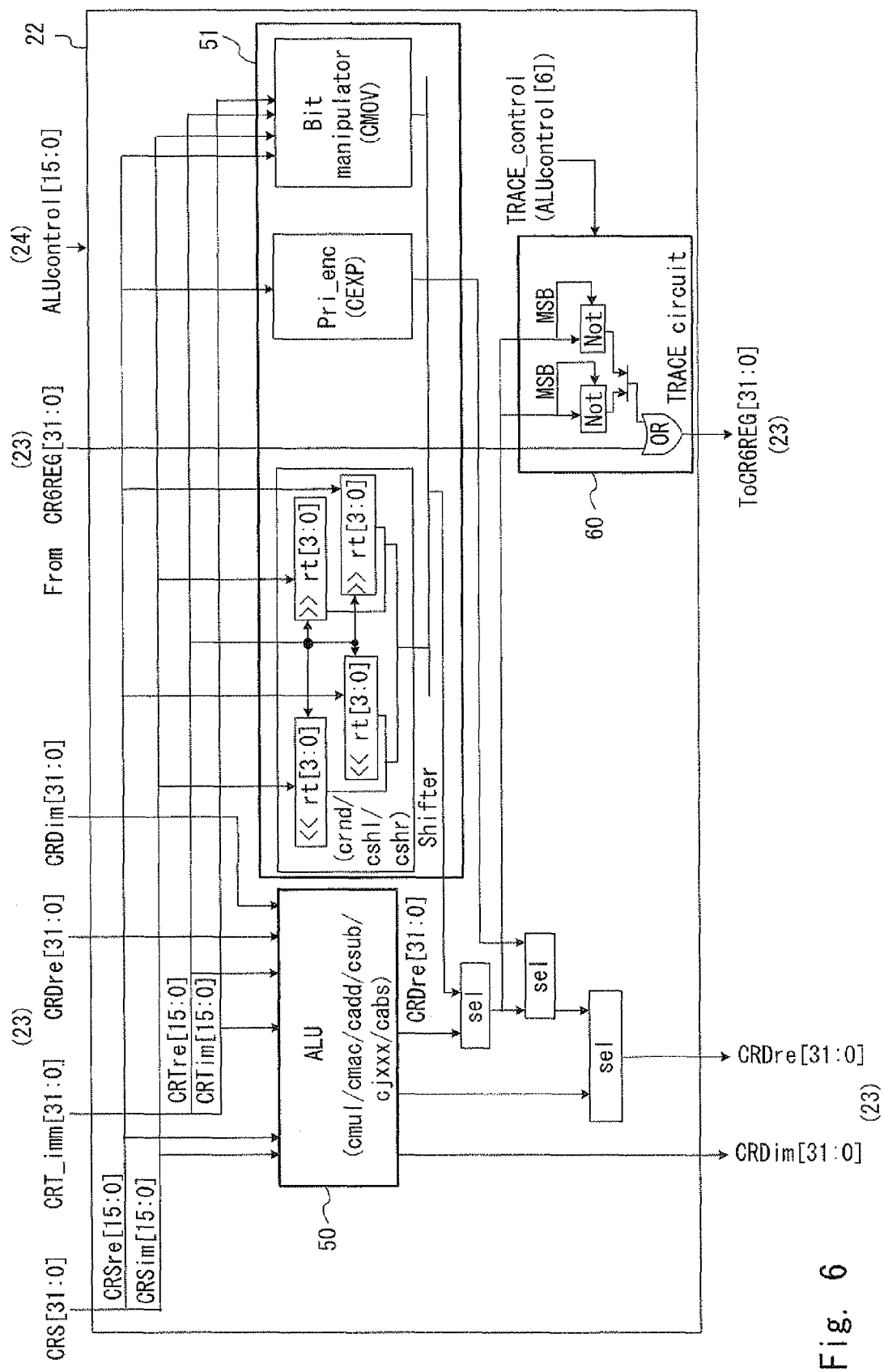
FIG. 6 is a block diagram showing a configuration example of a complex arithmetic-logic unit and a trace circuit used for the co-processor for complex arithmetic processing according to the first exemplary embodiment of the present invention.

FIG. 6 shows an overall configuration example of the ALU 22, a configuration example of the internal complex arithmetic-logic unit 51, and a configuration example of the trace circuit 60.

The complex arithmetic-logic unit 51 has, as interfaces thereof, input data (CRs, CRt(imm)), output data (CRd) and an arithmetic mode (ALU_control).

The complex arithmetic-logic unit 51 mainly includes a shifter circuit (Shifter) for the complex left-shifting instruction (CSHL), the complex right-shifting instruction (CSHR) and the complex rounding instruction (CRND), a maximum significant bit position detector circuit (Pri_enc) for the complex Exponent instruction (CEXP), and a bit manipulator for a complex move instruction (CMOV) and the like.

The maximum significant bit position detector circuit (Pri_enc) is an arithmetic circuit that detects in which bit the significant bit "1" appears for the first time in the direction from MSB of input data, and outputs the position of the detected significant bit.

The complex arithmetic-logic unit 51 addresses, in accordance with the arithmetic mode (ALU_control), various complex arithmetic instructions defined in e.g., FIG. 4 at one data/cycle.

In this way, the complex arithmetic-logic unit 51 changes the operation mode depending on the complex arithmetic instruction to be used, and executes the complex arithmetic operations. Thus, the complex arithmetic-logic unit 51 can be compatible at one data/cycle in a programmable manner with complex arithmetic processing in modulation/demodulation/synchronous processing in various radio communication methods.

Furthermore, the complex arithmetic instructions are repeatedly executed using a for-loop or the like, while operating the memory controller (LMC, SMC) 20 or 21 (register CR2, CR3 or the like), and the pilot generator 70 (register CR1). Thus, in the circuit configuration shown in FIG. 6, it is possible to execute at one data/cycle throughput complex arithmetic processing for long stream data series stored in the local memory or the shared memory.

[Configuration and Operation of Trace Circuit 60]

As shown in FIG. 6, the trace circuit 60 performs tracing (TRACE) by using as input interfaces three of the arithmetic result of complex arithmetic instruction, a trace control signal and a values in the special register (CR6) for trace, and re-outputs a result of tracing to the special register (CR6) for trace.

The trace circuit 60 has the characteristic of executing the tracing in parallel without cycle overhead, while executing any another complex arithmetic instruction under the trace control by the parameter register setting instruction from the controller 24.

The trace circuit 60 (tracing) is the one that performs the cumulative OR processing while using the special register (CR6) for trace, during which the significant bit in each of the real part (Re) and the imaginary part (Im) of the complex arithmetic result is treated as "1" so as to be able to detect the maximum significant bit position on one complex Exponent instruction (CEXP) after the tracing.

In other words, the trace circuit 60 performs the cumulative OR processing for each of the real part (Re) and the imaginary part (Im) of the complex arithmetic result as it is when each part is a positive number (MSB serving as the sign bit represents "0"). When each part is a negative number (MSB serving as the sign bit represents "1"), the trace circuit 60 inverts (NOT) all bits in the corresponding real part (Re) or the imaginary part (Im) and then performs the cumulative OR processing.

The implementation of such a trace circuit 60 makes it possible to cumulatively process (trace) maximum values of significant bit positions in respective real parts (Re) and imaginary parts (Im) of complex arithmetic results corresponding to certain data series without cycle overhead.

Moreover, the actual maximum significant bit position can be obtained by executing, once after the tracing, the complex Exponent instruction (CEXP) for detecting the position of bit representing "1" for the first time in the direction from MSB. It is possible to easily calculate the normalization coefficient in the case of performing the normalization for adjusting the dynamic range of data, by use of the result (bit position) obtained by executing the complex Exponent instruction (CEXP).

The trace control signal is a signal which becomes active when the trace function is valid (ON) by setting the parameter register (TRACING register) in the controller 24 or the like, and the output register number for the executed complex arithmetic instruction coincides with the register number set as the register to be traced in the TRACING register.

In other words, since the register number to be traced can be set, it is possible to designate which arithmetic result is to be traced.

Moreover, it is possible by the trace mode in the TRACING register to designate a case where the arithmetic result is in a 32 bits real data format, or the case where the arithmetic result in the 16 bits*2 complex data format as shown in FIG. 3B. Therefore, it is possible by the setting of trace mode to flexibly perform changing-over between tracing 32 bits all at once, and processing by 16 bits in the state where the real part (Re) and imaginary part (Im) are separated from each other.

[Configuration and Operation of Memory Controllers 20 and 21]

As having been shown in FIG. 2, each of the memory controllers (LMC, SMC) 20 and 21 includes therein the write address generator 30, the write data FIFO 31, the read address generator 40, the read data FIFO 41, and the preprocessing circuit 42.

[Configuration and Operation of Write Address Generator 30 and Write Data FIFO 31]

In the case of writing stream data, which is the arithmetic result, from the co-processor 11 to the memory through the register CR2 or CR3, the write address generator 30 and the write data FIFO 31 operate in the memory controller (LMC, SMC) 20 or 21.

Figure 7:
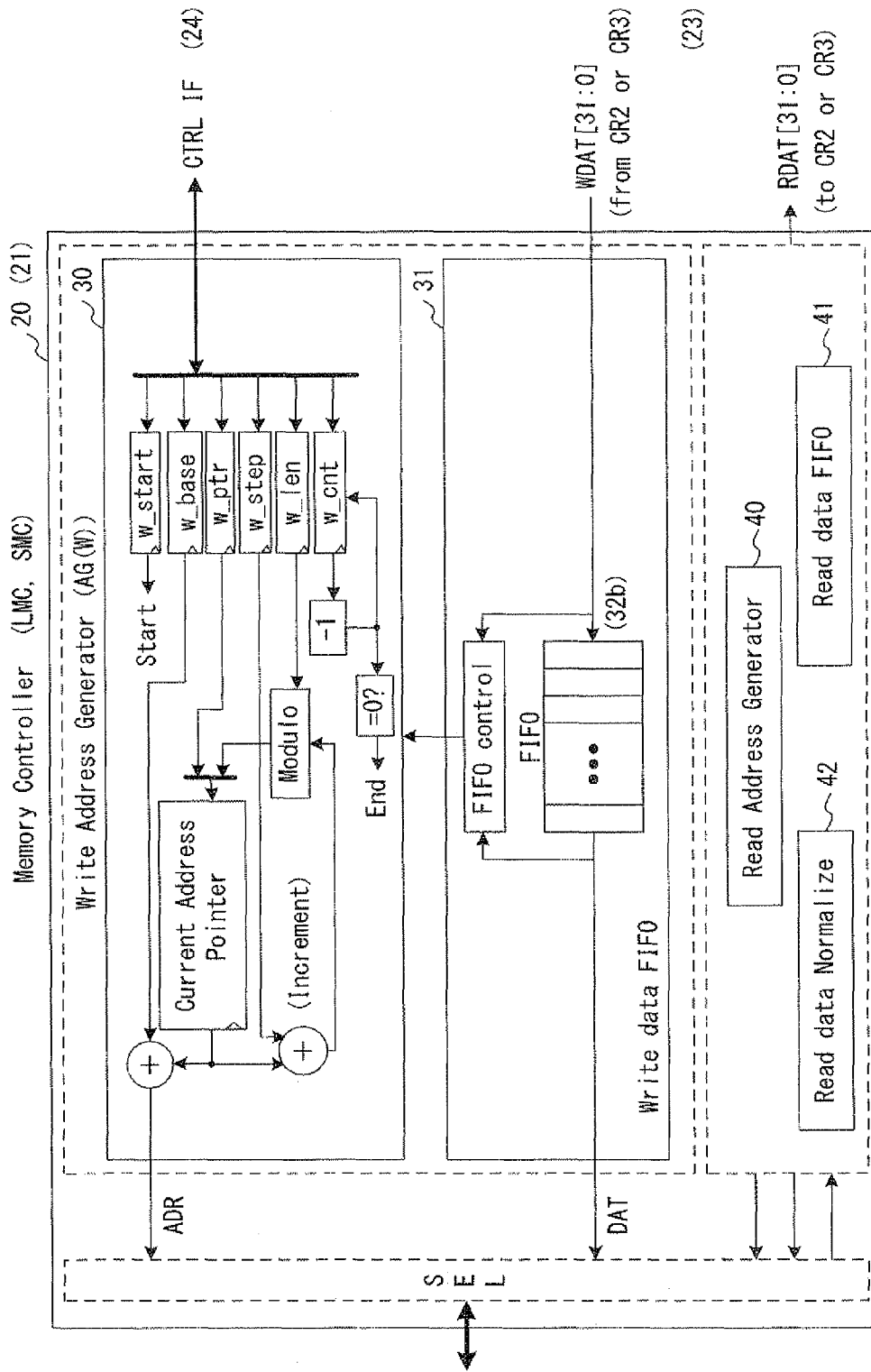
FIG. 7 is a block diagram showing a configuration example at the writing side of a memory controller used for the co-processor for complex arithmetic processing according to the first exemplary embodiment of the present invention.

FIG. 7 shows a configuration example of the write address generator 30 and the write data FIFO 31.

Firstly, the write address generator 30 includes, as control registers, a start register (w_start), a base address register (w_base), an initial pointer register (w_ptr), a step register (w_step), a memory length register (w_len) and a access count register (w_cnt).

When these registers are set with values by the parameter setting instructions from the co-processor and the write address generator 30 is booted, the write address generator 30 autonomously generates and issues an address every time data output is request from the write data FIFO 31.

Basically, the write address generator 30 issues the address obtained by adding a value of the current address pointer to the base address (w_base). The current address pointer uses a value of the initial pointer (w_ptr) as the initial value, and the value of the current address pointer is updated every time the address is output. Every time outputting the address, the write address generator 30 outputs, as the next address pointer, a result obtained by adding the step number (w_step) in a 32 bits address unit to the current address and then by performing a Modulo operation for the added address using the memory length size (w_len).

Thus, as shown in FIG. 7, the write address generator 30 includes a current address pointer register, two units of adders, a Modulo operation unit (which is composed of comparators and subtractors), and a comparator and a subtractor for counting the access count in addition to the above-mentioned control registers.

According to such a configuration, it is possible to perform writing to an arbitrary memory area with addresses continuing in ascending or descending order. It is also possible by controlling the step number (w_step) to perform the writing at arbitrary address intervals. Moreover, it is also possible by controlling the memory length (w_len) to perform the writing such that if the writing is started at the middle of memory and then reaches the end of memory, the writing returns to the head of memory. Accordingly, it is possible to generate flexible address patterns.

Next, there is described the write data FIFO 31.

Data output from the ALU 22 to the register CR2 or CR3 is output to the memory through the write data FIFO 31. When the data is input, the write data FIFO 31 cooperates with the write address generator 30 to sequentially store the data at the address on the memory indicated by the write address generator 30.

Thus, it is possible to access the memory in parallel with the arithmetic instructions from the processor 10 for control and the co-processor 11, thereby having no influence on the operation codes even when the memory side waits. Therefore, it is possible to hide the memory access latency upon the data writing.

In order to prepare for a case where the write data FIFO 31 becomes full due to the wait at the memory side, there is also provided Wait control mechanism to make the ALU 22 wait to execute the co-processor instruction through the register file (REG) 23. In this case, it is possible to normally carry on the execution of co-processor instruction processing.

[Configuration and Operation of Read Address Generator 40, Read Data FIFO 41 and Preprocessing Circuit 42]

In the case where the co-processor 11 reads stream data from the memory through the register CR2 or CR3, the read address generator 40, the read data FIFO 41 and the preprocessing circuit 42 operate in the memory controller (LMC, SMC) 20 or 21.

Figure 8:
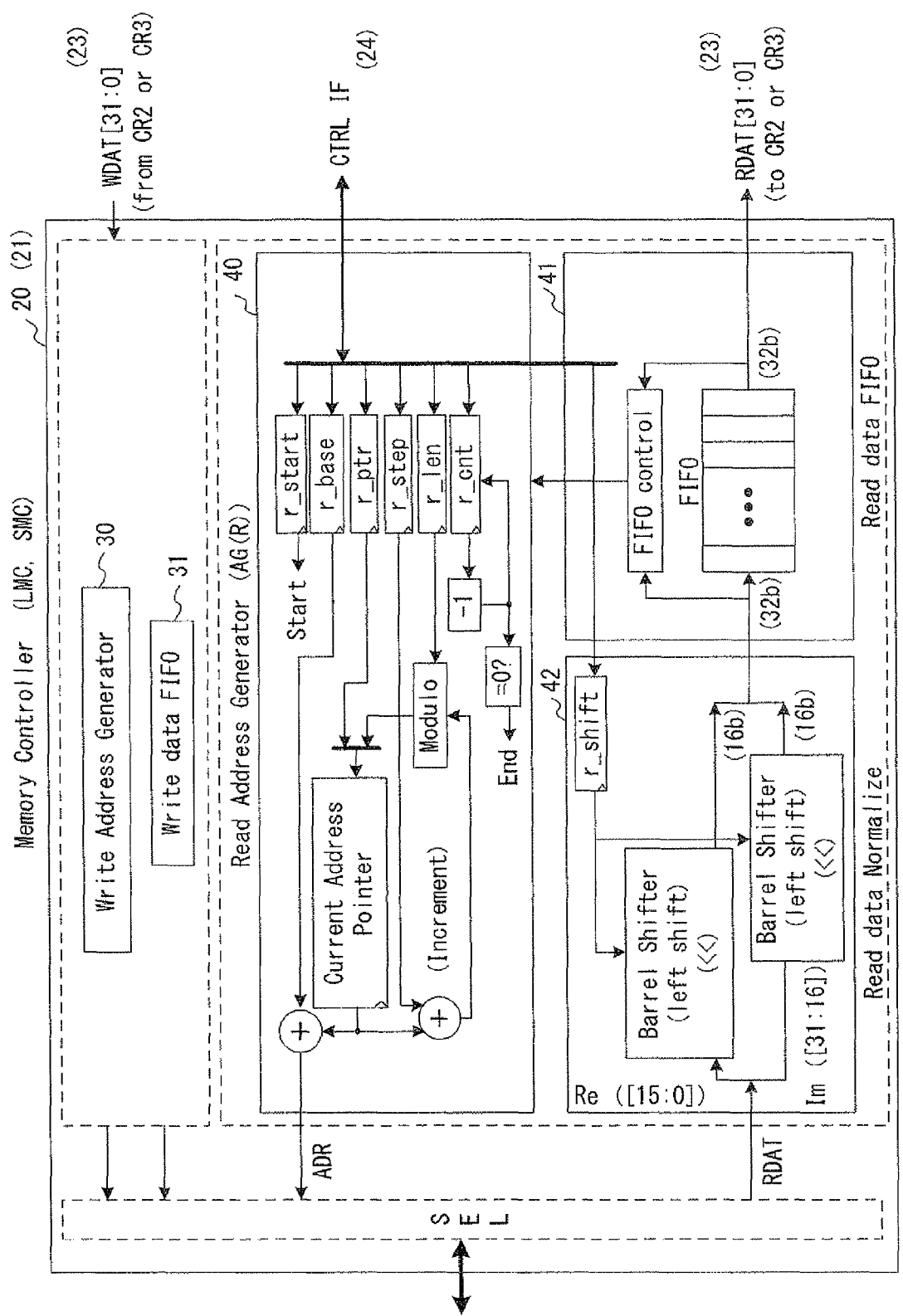
FIG. 8 is a block diagram showing a configuration example at the reading side of the memory controller used for the co-processor for complex arithmetic processing according to the first exemplary embodiment of the present invention.

FIG. 8 shows a configuration example of the read address generator 40, the read data FIFO 41 and the preprocessing circuit 42.

Firstly, as with the write address generator 30, the read address generator 40 includes, as control registers, a start register (r_start), a base address register (r_base), an initial pointer register (r_ptr), a step register (r_step), a memory length register (r_len) and a access count register (r_cnt).

When these registers are set with values by the parameter setting instructions from the co-processor and the read address generator 40 is booted by the setting to the start register (r_start), the read address generator 40 autonomously generates addresses for reading from the memory, and issues the addresses by the number corresponding to the access count register (r_cnt) in a continuous manner.

The issuing of read addresses in an anticipated manner addresses split transactions upon reading data.

Basically, the read address generator 40 issues the address obtained by adding a value of the current address pointer to the base address (r_base). The current address pointer uses a value of the initial pointer (r_ptr) as the initial value, and the value of the current address pointer is updated every time the address is output. Every time outputting the address, the read address generator 40 outputs, as the next address pointer, a result obtained by adding the step number (r_step) in a 32 bits address unit to the current address and then by performing a Modulo operation for the added address using the memory length size (r_len).

Thus, as shown in FIG. 8, the read address generator 40 includes a current address pointer register for actually calculating the addresses, two units of adders, a Modulo operation unit (which is composed of comparators and subtractors), and a comparator and a subtractor for counting the access count in addition to the above-mentioned control registers.

According to such a configuration, it is possible to perform data reading from an arbitrary memory area with addresses continuing in ascending or descending order. It is also possible by controlling the step number (r_step) to perform the reading at arbitrary address intervals. Moreover, it is also possible by controlling the memory length (r_len) to perform the reading such that if the reading is started at the middle of memory and then reaches the end of memory, the reading returns to the head of memory. Accordingly, it is possible to generate flexible read address patterns.

Next, there are described the read data FIFO 41 and the preprocessing circuit 42.

Data (RDAT) read from the memory is transferred to the ALU 22 through the preprocessing circuit 42 and the read data FIFO 41. The read data (RDAT) is firstly input to the preprocessing circuit 42.

As shown in FIG. 8, the preprocessing circuit 42 includes a normalization coefficient register (r_shift) for setting the amount of left-shifting, and a shifter circuit (barrel shifter) which performs arithmetic left-shifting. The amount of left-shifting is set based on the normalization coefficient (maximum significant bit position) calculated by the trace circuit 60 and the complex Exponent instruction (CEXP).

The shifter circuit (barrel shifter) performs, in accordance with the set value (amount of left-shifting) in the normalization coefficient register (r_shift), the arithmetic left-shifting for each of the real part (Re) and the imaginary part (Im) of complex data read from the memory.

In this way, the preprocessing circuit 42 performs the similar arithmetic left-shifting for certain complex data series. Thus, it is possible to normalize all data among the data series.

Moreover, the read address generator 40 performing the anticipating access to the memory and the subsequent read data FIFO 41 enable the preprocessing circuit 42 to operate without cycle overhead in parallel with the arithmetic processing in the processor 10 for control and the co-processor 11.

Moreover, pieces of read data normalized by the preprocessing circuit 42 are sequentially stored in the read data FIFO 41, and then transferred to the ALU 22 through the register file 23 (register CR2 or CR3).

Note that in order to prepare for a case where the read data FIFO 41 stores no desired data (the read data FIFO 41 is empty) due to the wait at the memory side or the like, there is also provided Wait control mechanism to make the ALU 22 wait to execute the co-processor instruction through the register file (REG) 23. In this case, it is possible to normally carry on the execution of co-processor instruction processing.

[Overall Operation Example of Processor System 100]

Figure 9:
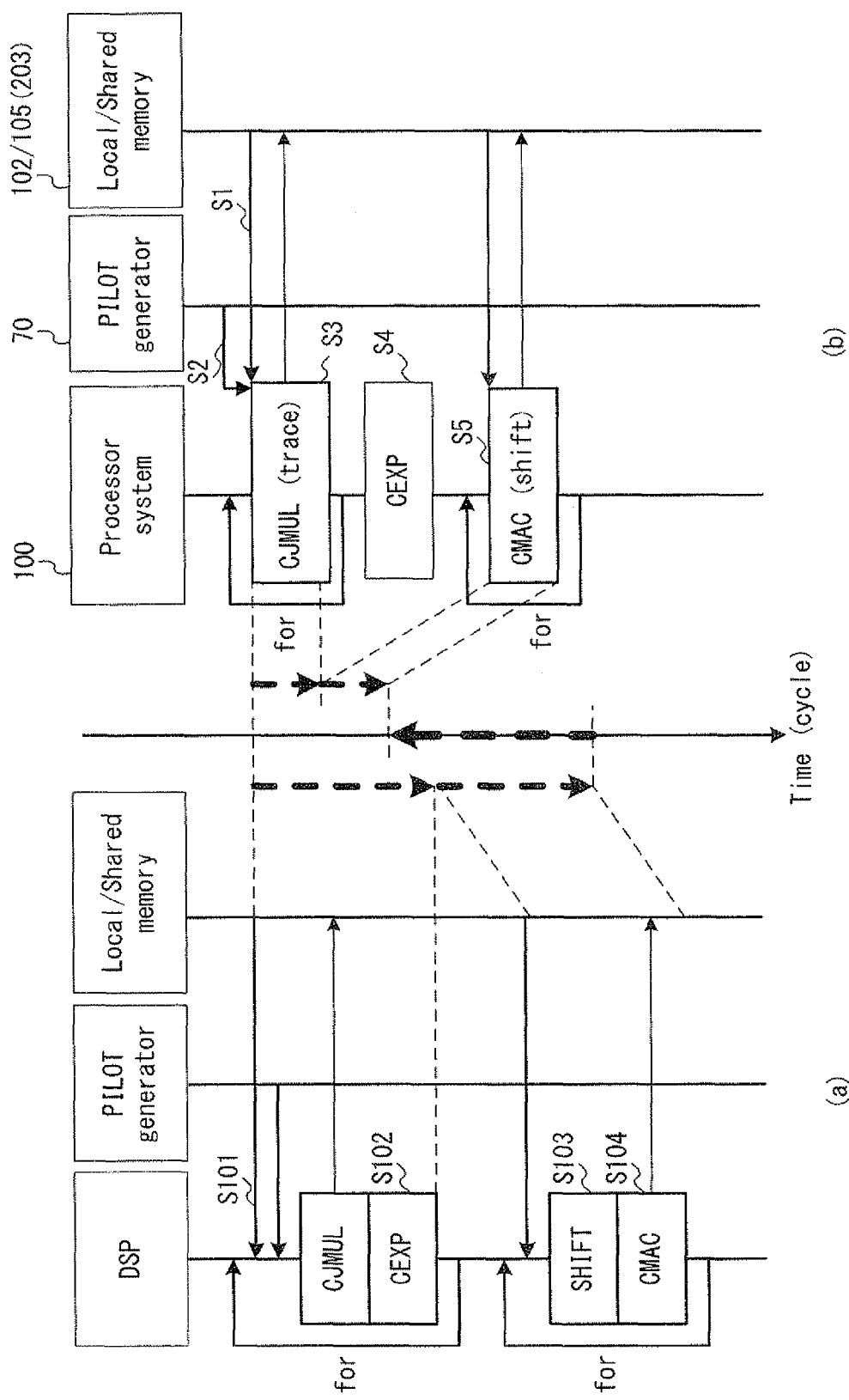
FIG. 9 is a sequence diagram showing an operation example of the processor system according to the first exemplary embodiment of the present invention.

A part (b) in FIG. 9 shows an overall operation example of the processor system 100. Specifically, the example deals with a case where the co-processor 11 reads complex data series (stream data) from a memory (the local memory 102 or a shared memory 105 (or a shared memory 203 shown in FIG. 10)) through the register CR2 or CR3, performs desired demodulation (complex arithmetic processing) such as channel estimation, and writes processing result data to the memory (local memory 102, or the shared memory 105 (or 203)) through the register CR2 or CR3.

This is an example of cases where complex conjugate multiplication (CJMUL) is performed using a series of pilot signals for stream data on the memory, and then complex multiply and accumulation (CMAC) are further performed for the result data. Meanwhile, the example deals with a case where it is necessary for input data to be normalized upon the complex multiply and accumulation.

In order that advantageous effects of this exemplary embodiment may be better understood, operations in a case of using a typical DSP according to the related art are firstly described with reference to a part (a) in FIG. 9. Then, by comparing with these operations, the overall operation of this exemplary embodiment will be described with reference to the part (b).

As shown at the part (a) in FIG. 9, the DSP reads a series of pilot signals and complex data series prior to a complex conjugate operation (CMUL) with the first pilot signal (reference signal) (Step S101). At this time, with respect to respective reading, it takes cycles for calculating addresses and cycles for reading data. Moreover, in a case where the storage location for complex data series requires the access latency like the shared memory 105 (or 203), it further takes additional cycles for access.

After that, the DSP needs to normalize input data upon the next complex multiply and accumulation (CMAC). Therefore, the DPS executes a complex Exponent instruction (CEXP), thereby calculating a normalization coefficient (maximum significant bit position). The Cycle of executing the complex Exponent instruction (CEXP) is required for each piece of data.

Then, the DSP repeats these processes by one data series using a for-loop or the like.

After that, the DSP performs the normalization (left-shifting) for each piece of data (Step S103), and the complex multiply and accumulation (CMAC) following the normalization (Step S104).

Then, the DSP repeats these processes by one data series using a for-loop or the like, and then terminates the arithmetic processing.

On the other hand, in this exemplary embodiment, parameters are set to the address generators 30 and 40 in each of the memory controllers (LMC, SMC) 20 and 21, and they are booted. As shown at the part (b) in FIG. 9, the memory controller 20 or 21 autonomously reads pieces of data from the memory, and sequentially stores the read data in the read data FIFO 41 (split transactions) (Step S1).

Similarly, the pilot generator 70 is also set to start operations, so that pilot signal data series are sequentially stored in the register CR1 (Step S2).

Moreover, the setting of making the trace valid is performed for the TRACING register in the controller 24, by the parameter register setting instruction from the co-processor.

Then, the ALU 22 executes the complex conjugate multiplication instruction (CJMUL) by using as input the resisters CR1 and CR3, and by using as output the register CR2 (Step S3). Thus, the processor system 100 can store the arithmetic result data in the local memory (data memory) 102, while hiding the access latency on the shared memory and the access latency of pilot data, and tracing (by use of the register CR6) the maximum significant bit position of arithmetic results in the trace circuit 60.

As a result, in a for-loop for processing one data series, the same complex conjugate multiplication instruction (CJMUL) is only repeated.

Next, the ALU 22 executes the complex Exponent instruction (CEXP) only once prior to the execution of complex multiply and accumulation instruction (CMAC) (Step S4). Thus, the normalization coefficient is calculated. This normalization coefficient is set to the normalization registers (r_shift) in the memory controllers (LMC, SMC) 20 and 21.

Then, the ALU 22 executes complex multiply and accumulation instructions (CMAC) by one data series using a for-loop or the like. At this time, the preprocessing circuit 42 performs the normalization (left-shifting) for input data in parallel with the complex multiply and accumulation instructions (CMAC) (Step S5).

In this way, the modulation (complex arithmetic processing) such as equalization including the normalization is executed by using the processor system 100. Thus, it is possible to limit the number of processing instructions in the for-loop to one (complex conjugate multiplication instruction (CJMUL) or multiply and accumulation instruction (CMAC)), while some cycles are required for the setting to the memory controllers (LMC, SMC) 20 and 21, and the like.

Generally, the length of one data series (the repeat count of for-loop) is greatly longer than the cycles for the setting to the memory controllers (LMC, SMC) 20 and 21, and thus the number of processing cycles in the for-loop is dominant. Therefore, as shown in FIG. 9 by dot-lined arrows, in the processor system 100, it is possible to speed up more than almost twice the case of using the typical DSP. In other words, the typical DSP takes cycles for the detection (CEXP) of maximum significant bit position and the normalization (SHIFT) of input data in the for-loop in addition to the complex arithmetic instruction, as well as cycles for reading input data and pilot data in some cases. On the other hand, the processor system 100 can reduce (process in parallel) the number of processing cycles in the for-loop by setting parameters to the trace circuit 60 and the preprocessing circuit 42.

Note that in the co-processor 11, one of the trace circuit 60 and the preprocessing circuit 42 may be provided. It will be clearly understood that this case also makes it possible for arithmetic processing to be more speeded up and efficient.

[Example of Application]

Figure 10:
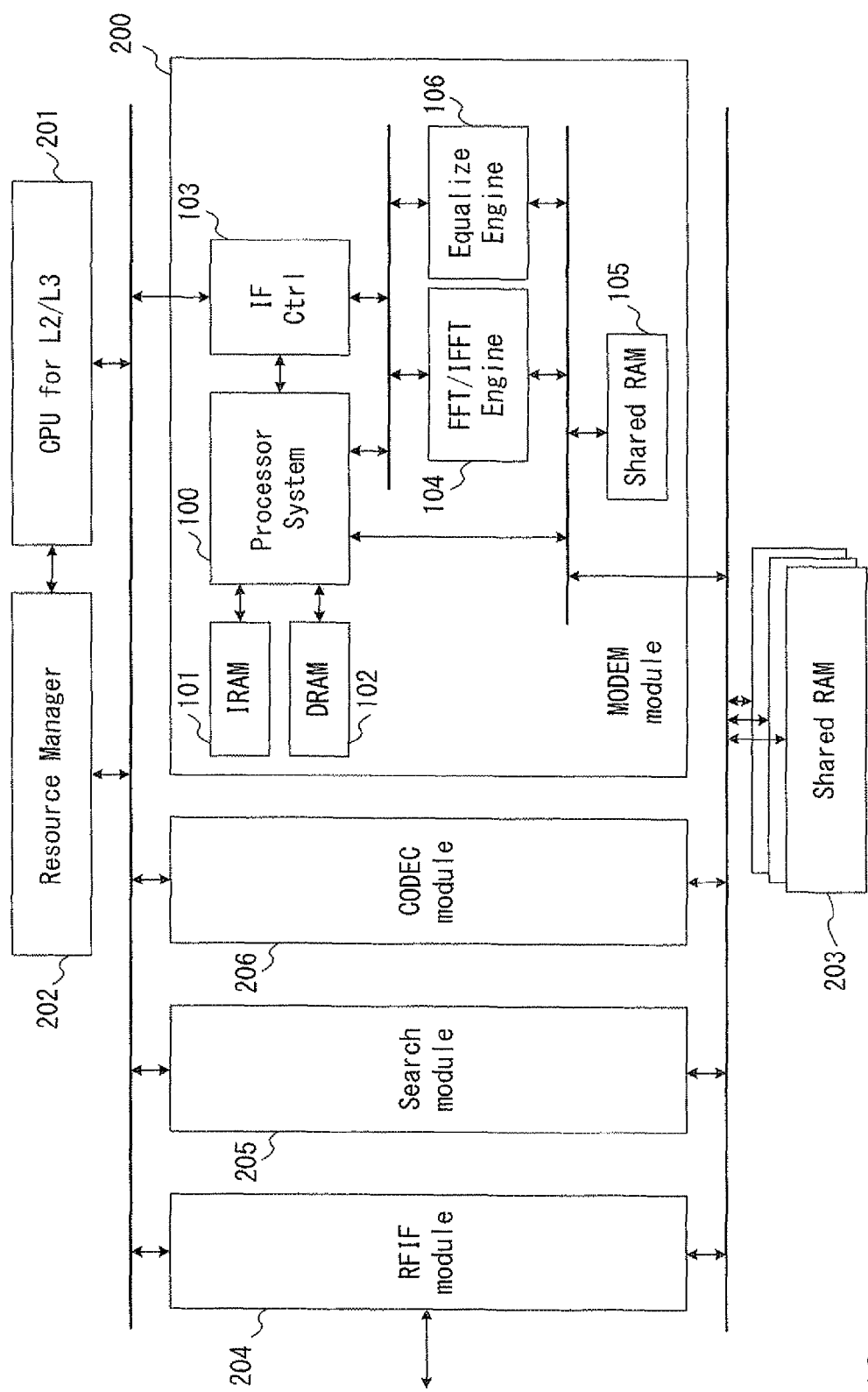
FIG. 10 is a block diagram showing an example of application to which the co-processor for complex arithmetic processing according to the first exemplary embodiment of the present invention is applied.

FIG. 10 shows a configuration example of a radio communication system in a case where the above-mentioned processor system 100 is applied as an example to modulation/demodulation modules (MODEM) which can be compatible with a plurality of radio communication methods including Wireless LAN (IEEE 802.11a) method, WiMAX (IEEE 802.16e) method and the like standardized in IEEE.

This radio communication system includes a modem module (MODEM) 200, an RF (Radio Frequency) interface module 204, a search module (Search) 205, and a codec module (CODEC) 206. The modem module (MODEM) 200 performs modulation for data to be transmitted and demodulation for received data. The search module (Search) 205 performs establishment of synchronization with an opposed communication device and timing search therefor. The codec module (CODEC) 206 performs encoding for the data to be transmitted and decoding for the received data.

Further, this radio communication system includes a general processor (CPU) 201, a resource manager 202, and a shared memory 203. The general processor (CPU) 201 executes processing at upper layers (Layer2/Layer3). The shared memory 203 is used for transferring data between the modules.

Moreover, the modem module (MODEM) 200 includes the above-mentioned processor system 100, instruction memory (IRAM) 101 and data memory (DRAM) 102, an interface control circuit 103, an FFT/IFFT processing engine 104, an equalizing engine 106, and a shared memory 105 used for transferring data between the processor system 100 and the FFT/IFFT processing engine 104.

In other words, only the FFT/IFFT processing and the equalization among modulation/demodulation processes, the processing amounts of which are huge and thus the resources for which are insufficient if they are processed by the processor, are executed by use of the FFT/IFFT processing engine 104 and the equalizing engine 106 which are dedicated hardware. Meanwhile, the other modulation/demodulation processes such as channel estimation in the plurality of radio communication methods are executed by use of the processor system 100.

Figure 11A:
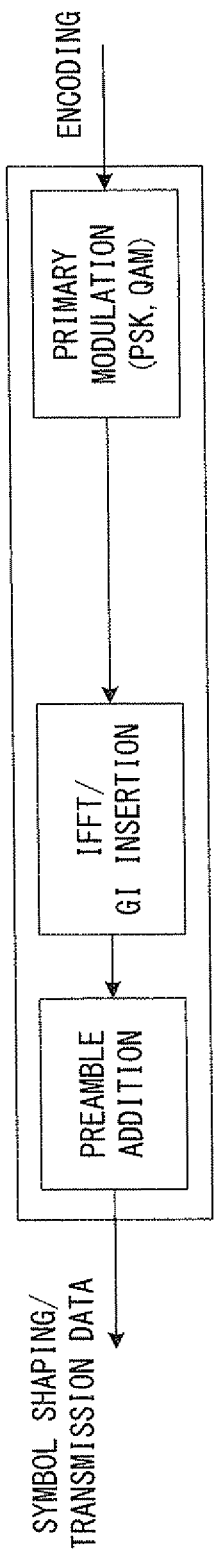
FIG. 11A is a diagram showing an example of modulation in the example of application shown in FIG. 10.
Figure 11B:
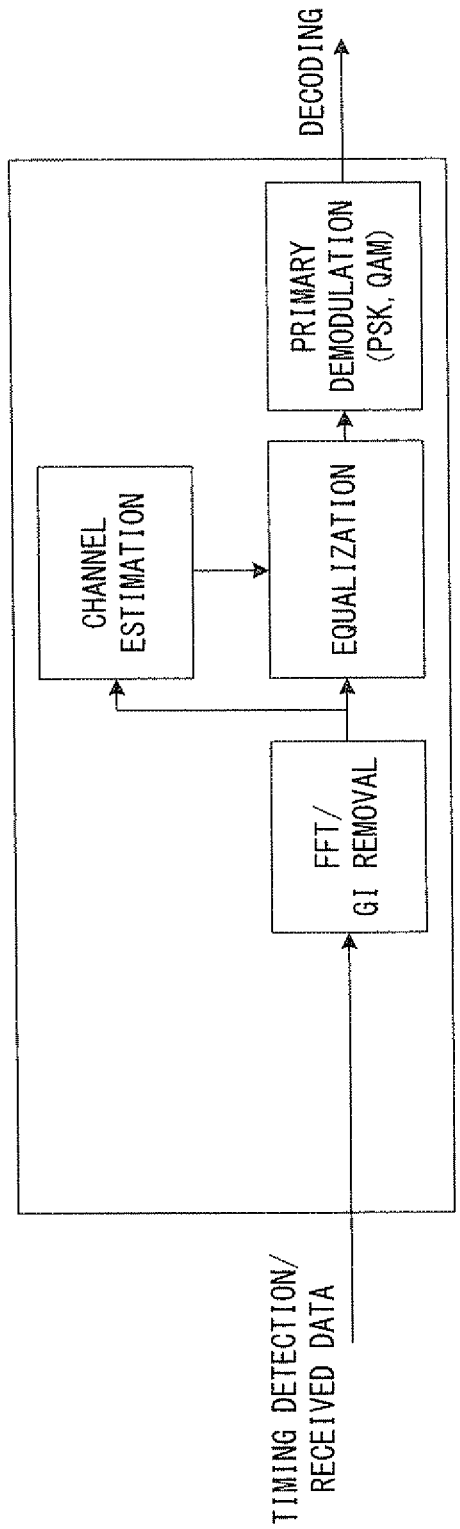
FIG. 11B is a diagram showing an example of demodulation in the example of application shown in FIG. 10.

FIGS. 11A and 11B show an example of modulation and an example of demodulation in this application example, respectively.

As shown in FIG. 11A, as the modulation at the transmitting side, processes are performed for data series to be transmitted after the encoding which are transferred from the CODEC module 206 in the order of (1) primary modulation (PSK, QAM), (2) IFFT processing and GI (Guard Interval) insertion, and (3) preamble (reference signal) addition. Then, the modulated data series are transferred thorough the shared memory 203 to the RF interface module 203 which performs symbol shaping and transmission.

On the other hand, as shown in FIG. 11B, as the demodulation at the receiving side, processes are performed at the reception timing detected by the SEARCH module 205 for received data series which are transferred from the RF interface module 204 in the order of (1) FFT processing and GI removal, (2) channel estimation, (3) equalization, and (4) primary demodulation (PSK, QAM). Then, the demodulated data series are transferred through the shared memory 203 to the CODEC module 206 which performs decoding.

Figure 12:
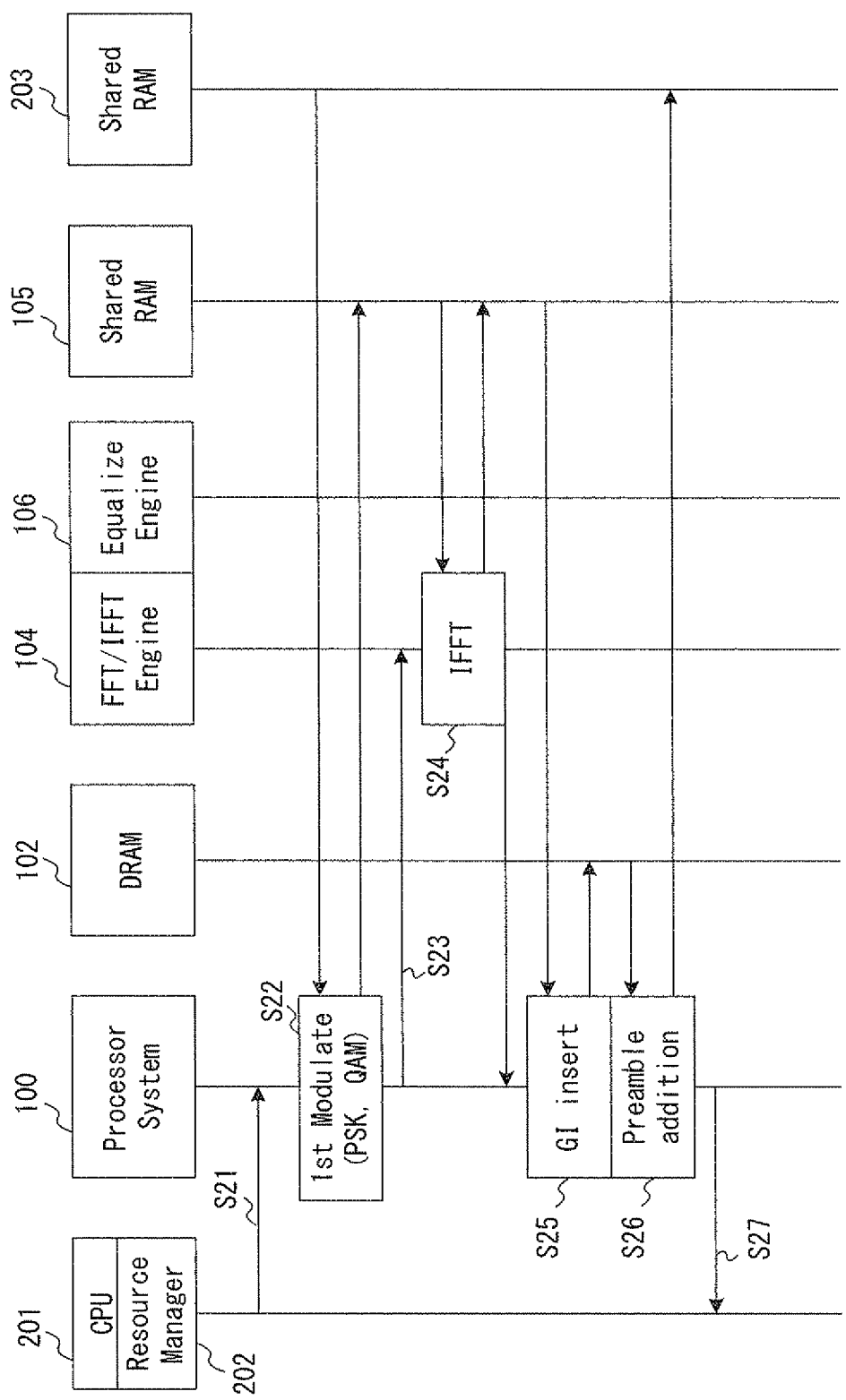
FIG. 12 is a sequence diagram showing an example of modulation for data to be transmitted in the example of application shown in FIG. 10.

FIG. 12 is a sequence diagram in a case of executing the processing flow shown in FIG. 11A.

In the case of the modulation for data series to be transmitted, the general processor (CPU) 201 or the resource manager 202 provides a processing start command to the processor system 100 (Step S21).

In the processor system 100 which has received this command, the ALU 22 performs the modulation (PSK, QAM) while reading input data series from the shared memory 203 by use of the shared memory controller 21, and data is stored in the shared memory 203 by use of the shared memory controller 21 (Step S22). Then, for the IFFT processing, the processor system 100 sets parameters such as an memory address and an operation mode to the FFT/IFFT processing engine 104, thereby booting the FFT/IFFT processing engine 104 (Step S23).

The FFT/IFFT processing engine 104 performs, in accordance with the set parameters, the IFFT processing for the data read from the shared memory 105 within the MODEM module 200, and stores the processing result data in the same shared memory 105. Then, the FFT/IFFT processing engine 104 notifies the processor system 100 of the completion of IFFT processing by an interruption for completion of processing (Step S24).

Next, the processor system 100 performs the GI insertion and the preamble addition by use of the shared memory controller 21, the local memory controller 20 and the like, and stores the data series to be transmitted to which preambles are added in the shared memory 203 outside of the MODEM module 200 by use of the shared memory controller 21 (Steps S25 and S26). Then, the processor system 100 notifies the general processor (CPU) 201 or the resource manager 202 of the completion of processing (Step S27).

The processing sequences as described above are repeated, so that the modulation for data series to be transmitted is implemented.

Figure 13:
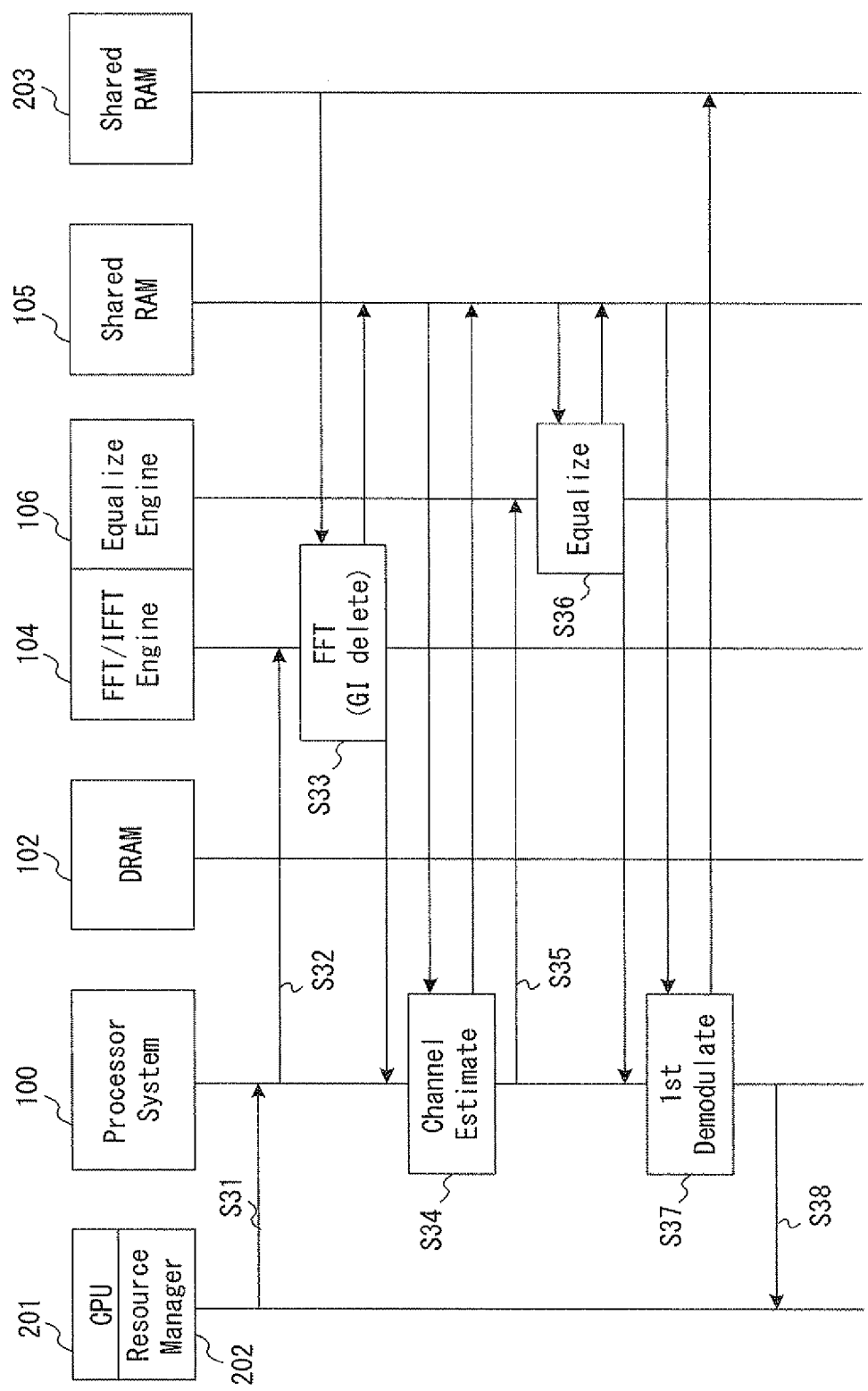
FIG. 13 is a sequence diagram showing an example of demodulation for received data in the example of application shown in FIG. 10.

On the other hand, FIG. 13 is a sequence diagram in a case of executing the processing flow shown in FIG. 11B.

In the case of the demodulation for received data series, the general processor (CPU) 201 or the resource manager 202 provides a processing start command to the processor system 100 (Step S31).

The processor system 100, which has received this command, sets parameters such as an memory address and an operation mode to the FFT/IFFT processing engine 104 for the FFT processing and the GI removal in accordance with the operation timing notified from the SEARCH module 205, thereby booting the FFT/IFFT processing engine 104 (Step S32).

The FFT/IFFT processing engine 104 performs, in accordance with the set parameters and the operation timing, the FFT processing for the data read from the shared memory 203 outside of the MODEM module 200, and stores the processing result data in the shared memory 105 within the MODEM module 200. Then, the FFT/IFFT processing engine 104 notifies the processor system 100 of the completion of FFT processing by an interruption for completion of processing (Step S33).

Next, the processor system 100 reads the processing data series after the FFT processing from the shared memory 105 within the MODEM module 200 by use of the shared memory controller 21, and performs the channel estimation for the read data series (Step S34).

Next, the processor system 100 sets parameters such as an memory address and an operation mode to the equalizing engine 106 for the channel estimation, thereby booting the equalizing engine 106 (Step S35).

The equalizing engine 106 performs, in accordance with the set parameters and the operation timing, the equalization using received data signals and results of the channel estimation read from the shared memory 105 within the MODEM module 200, and stores the processing result data in the same shared memory 105. Then, the equalizing engine 106 notifies the processor system 100 of the completion of equalization by an interruption for completion of processing (Step S36).

Finally, in the processor system 100, the ALU 22 performs the primary demodulation (PSK, QAM) (de-mapping) while reading the received data after the equalization from the shared memory 105 within the MODEM module 200 by use of the shared memory controller 21, and the demodulated data is stored in the shared memory 203 outside of the MODEM module 200 (Step S37). Then, the processor system 100 notifies the general processor (CPU) 201 or the resource manger 202 of the completion of processing (Step S38).

The processing sequences as described above are repeated, so that the demodulation for received data series is implemented.

[Second Exemplary Embodiment]

Figure 14:
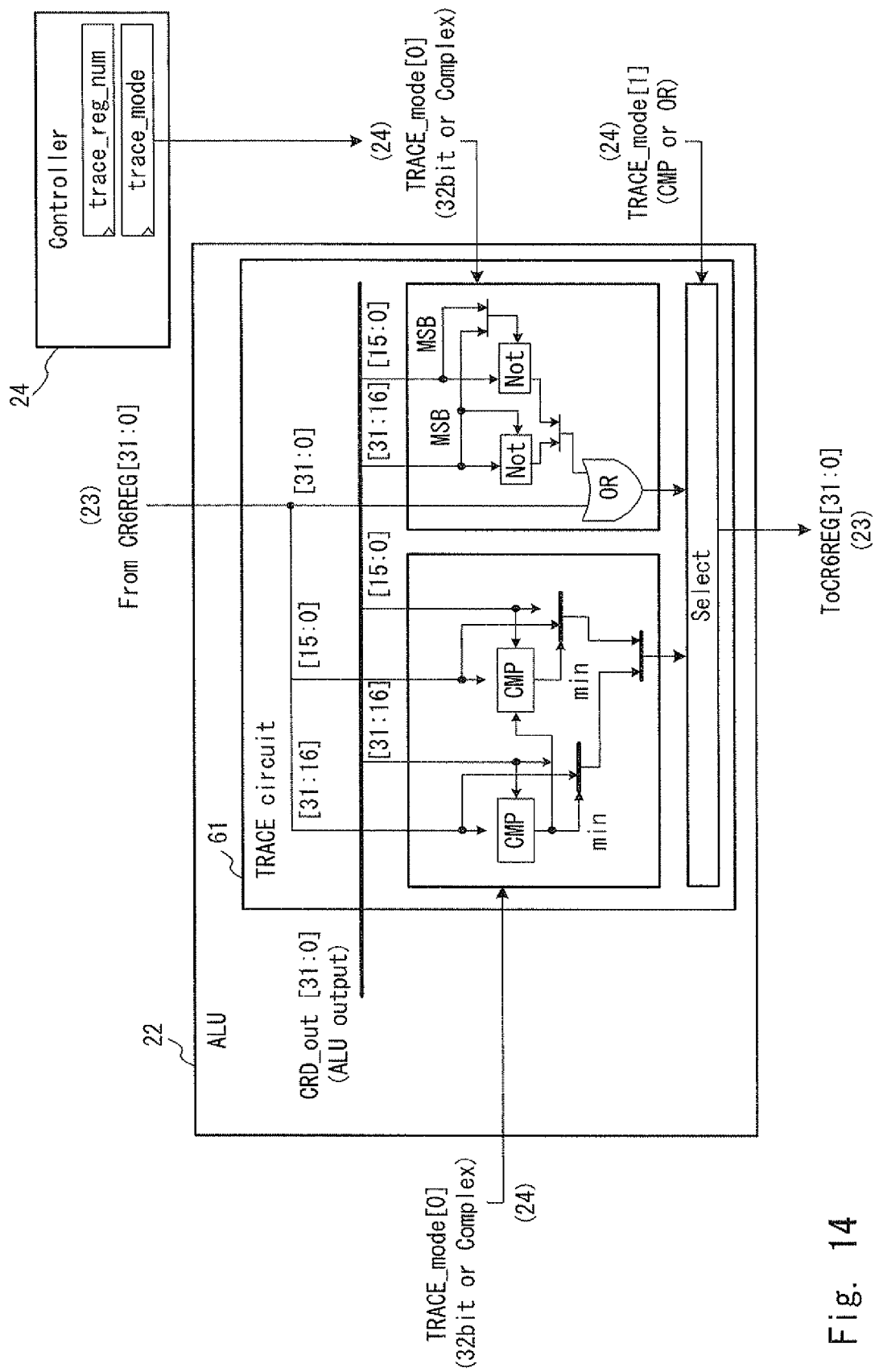
FIG. 14 is a block diagram showing a configuration example of a trace circuit used for a co-processor for complex arithmetic processing according to a second exemplary embodiment of the present invention.
Figure 15:
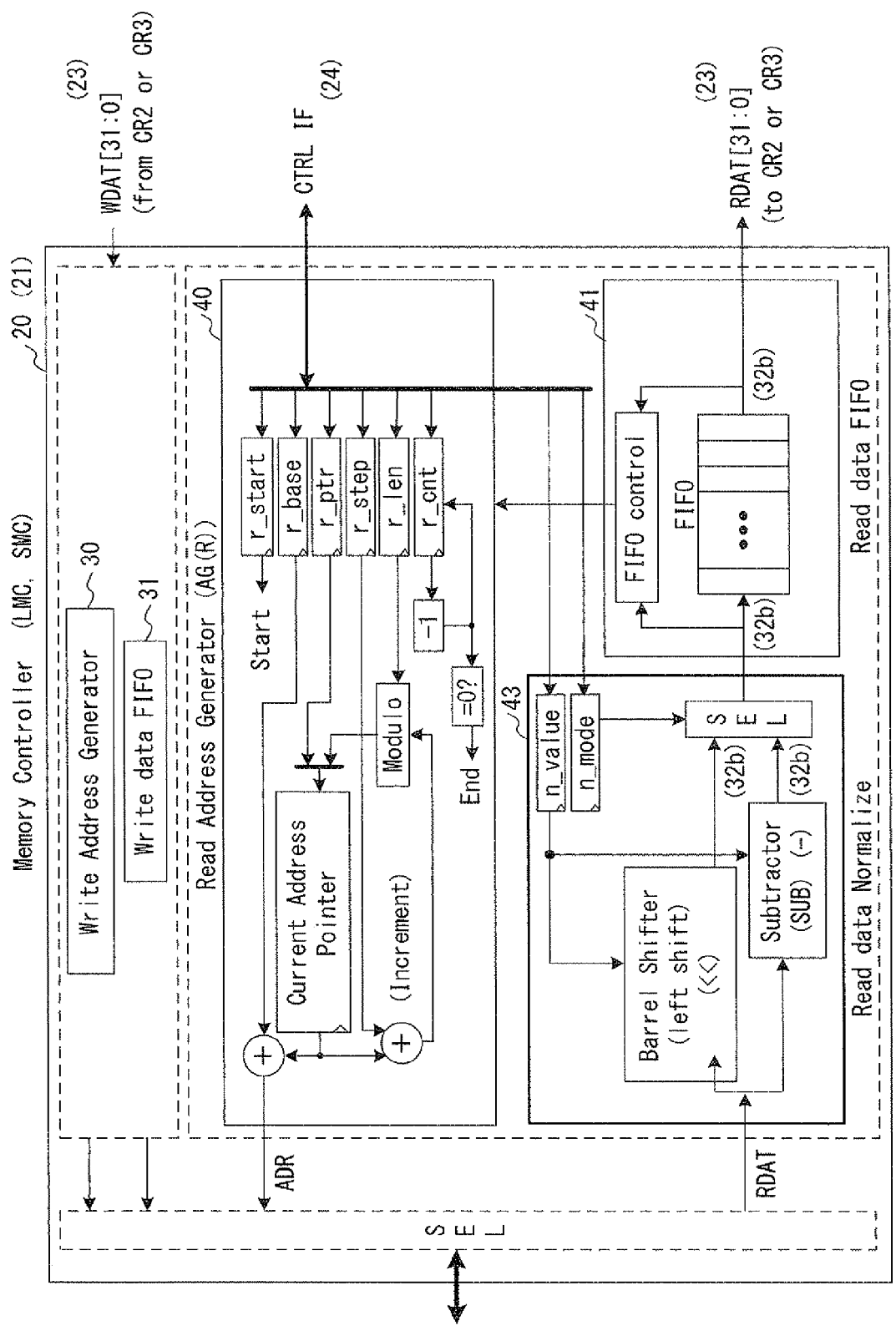
FIG. 15 is a block diagram showing a configuration example at the reading side of a memory controller used for the co-processor for complex arithmetic processing according to the second exemplary embodiment of the present invention.

A processor system according to this exemplary embodiment can be configured in a similar manner as the above-mentioned first exemplary embodiment. Meanwhile, in this exemplary embodiment, the trace circuit and the preprocessing circuit are configured as shown in FIGS. 14 and 15, respectively. Thus, in a case of performing cumulative addition in the synchronous processing and the like, it prevents a value of the cumulative addition from overflowing.

In the above-mentioned first exemplary embodiment, it is possible as the normalization for adjusting the dynamic range of arithmetic result data to detect (at the trace circuit 60) the maximum significant bit position, and to perform (at the preprocessing circuit 42) the arithmetic left-shifting for input data.

On the other hand, in this exemplary embodiment, the trace circuit and the preprocessing circuit are configured so as to be able to address normalization for preventing a result of the cumulative addition from overflowing above the range of significant bits in the cumulative addition (multiply and accumulation) and the detection of maximum peak value particularly in synchronous processing, despreading and the like. In other words, this exemplary embodiment is different from the above-mentioned first exemplary embodiment in configurations and operations of the trace circuit and the preprocessing circuit. Note that configurations and operations of other circuits are similar to those in the above-mentioned first exemplary embodiment.

As shown in FIG. 14, a trace circuit 61 according to this exemplary embodiment also mounts thereon the trace circuit shown in the above-mentioned first exemplary embodiment (FIG. 6). In addition, a minimum value detector circuit (comparators and selectors), which selects the smaller one of values in the complex arithmetic result data and the register (CR6) for trace, is mounted on the trace circuit 61.

Further, the trace circuit 61 also mounts thereon an output selector which selects, in accordance with a trace mode signal, the output from the maximum significant bit position detector circuit (trace circuit 60) shown in the above-mentioned first exemplary embodiment (FIG. 6), or the output from the minimum value detector circuit specific to this exemplary embodiment, and then provides the selected output to the register for trace.

Note that as registers for parameters, a trace mode register (trace_mode) and a traced-register number register (trace_reg_num) are mounted on the controller 24.

The trace circuit 61 can select to, in accordance with the setting to the trace mode register in the controller 24, (a) trace the maximum significant bit position, or (b) trace a minimum value among the arithmetic results.

The operation in the case of tracing the maximum significant bit position is the same as that in the above-mentioned first exemplary embodiment (FIG. 6).

On the other hand, in the case of tracing the minimum value among the arithmetic results, the comparator compares the complex arithmetic result data at the ALU 22 with the value in the register (CR6) for trace, and then the selector selects the smaller value to be stored in the register (CR6) for trace. This process is repeated for complex arithmetic processing for certain data series. Thus, a minimum value among the arithmetic result data series is stored in the register for trace.

Note that this tracing can be executed without cycle overhead, because it can be executed in parallel with typical co-processor instructions (complex arithmetic processing) as with the above-mentioned first exemplary embodiment.

Further, the trace mode signal is a signal which becomes active when the output register number for the complex arithmetic instruction coincides with the register number set to the traced-register number register (trace_reg_num) in the controller 24. In other words, since the register number to be traced can be set, it is possible to designate which arithmetic result is to be traced.

Furthermore, it is possible by the trace mode register to designate the case where the arithmetic result is in a 32 bits real data format, or the case where the arithmetic result in the 16 bits*2 complex data format as shown in FIG. 3B. Therefore, it is possible by the setting of trace mode to flexibly perform changing-over between tracing 32 bits all at once, and processing by 16 bits in the state where the real part (Re) and imaginary part (Im) are separated from each other.

On the other hand, as shown in FIG. 15, a preprocessing circuit 43 according to this exemplary embodiment also mounts thereon the left-shifter circuit (barrel shifter) shown in the above-mentioned first exemplary embodiment (FIG. 8), which performs the arithmetic left-shifting. In addition, the preprocessing circuit 43 also mounts thereon a subtractor which subtracts an arbitrary value from input data in accordance with the mode setting.

Further, the preprocessing circuit 43 also mounts thereon an output selector which selects, in accordance with a set value in a normalization mode register (n_mode), the output from the left-shifter circuit shown in the above-mentioned first exemplary embodiment (FIG. 8), or the output from the subtractor specific to this exemplary embodiment, and then provides the selected output to the read data FIFO 41.

Note that the preprocessing circuit 43 also mounts thereon, as a parameter register, a normalization coefficient register (n_value) for setting the amount of left-shifting or the value (amount) of subtraction in addition to the above-mentioned normalization mode register (n_mode).

The preprocessing circuit 43 can select to, in accordance with the setting to the normalization mode register, (a) perform the arithmetic left-shifting for adjusting the dynamic range, or (b) perform the subtraction for preventing the overflow.

Operations in the case of performing the normalization by the arithmetic left-shifting are similar to those in the above-mentioned first exemplary embodiment (FIG. 8).

On the other hand, in a case of performing the normalization by the subtraction, a fixed value set in the normalization coefficient register (n_value) is subtracted from each piece of input data to be output to the read data FIFO 41.

An appropriate value of subtraction is set by use of the trace circuit 61. Thus, it is possible to perform the cumulative addition (multiply and accumulation) while preventing the overflow.

Note that this normalization can be executed without cycle overhead, because it can be executed in parallel with typical co-processor instructions (complex arithmetic processing) as with the above-mentioned first exemplary embodiment.

Figure 16A:
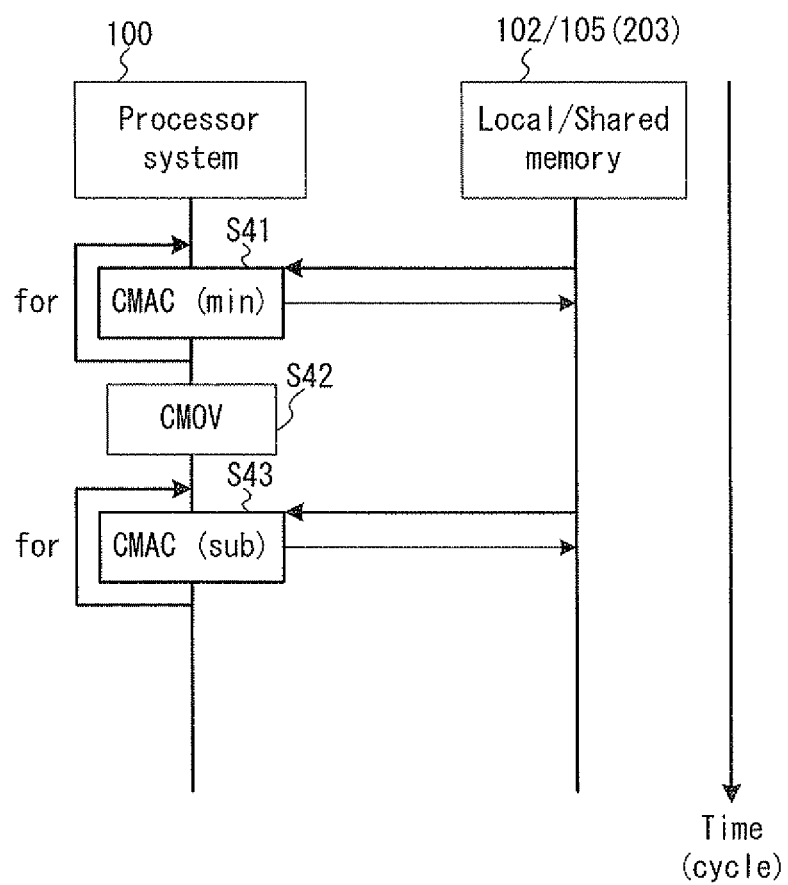
FIG. 16A is a sequence diagram showing an operation example of a processor system according to the second exemplary embodiment of the present invention.
Figure 16B:
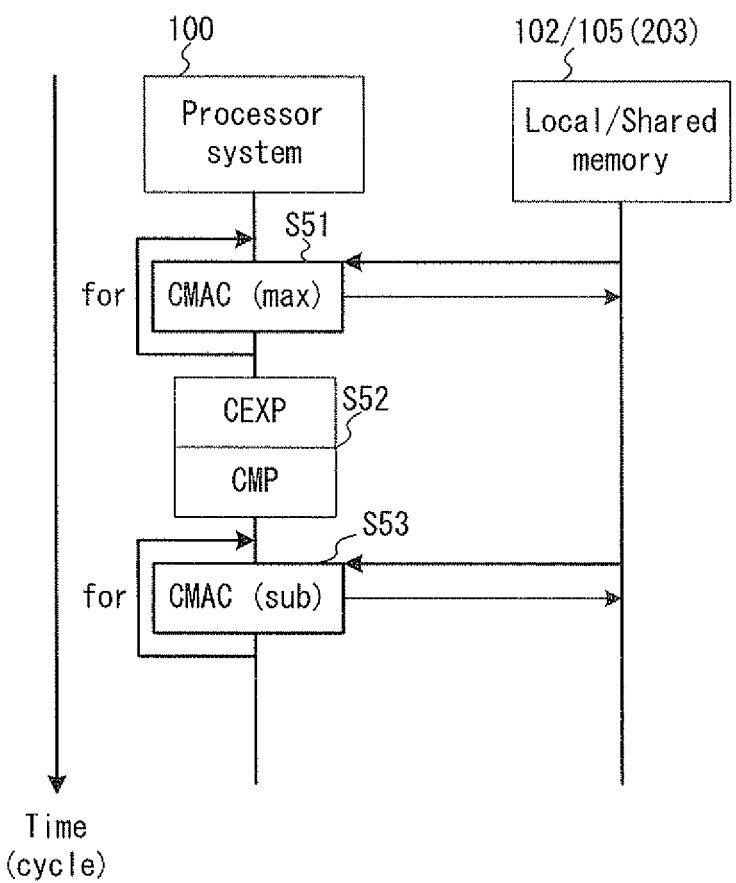
FIG. 16B is a sequence diagram showing another operation example of the processor system according to the second exemplary embodiment of the present invention.

FIGS. 16A and 16B show operation examples of the processor system according to this exemplary embodiment, respectively.

Firstly, there will be described operations in a case of performing normalization shown in FIG. 16A (hereinafter, referred to as "normalization A").

The normalization A is processes to trace a minimum value of arithmetic result data upon cumulative addition (multiply and accumulation) operations such as synchronous processing and despreading, and then to subtract the minimum value from each piece of arithmetic result data (input data for the next processing), thereby preventing the overflow.

In this case, the processor system 100 sets, upon the initial cumulative addition (multiply and accumulation) operation, the trace mode with the mode for detecting the minimum value.

The ALU 22 can store processing result data in the memory (local memory 102) while hiding the memory access latency for input and output data, and tracing the minimum value of processing result data (using the CR6 register), by executing desired cumulative addition instructions (CMAC) (Step S41).

As a result, the number of cycles in a for-loop for processing one data series becomes the one for only repeating the same complex multiply and accumulation instruction (CMAC).

Next, the ALU 22 sets, by the move instruction (CMOV), the minimum value (value in the register CR6) obtained by the tracing to the normalization coefficient registers (n_value) in memory controllers (LMC, SMC) 20 and 21, and sets the normalization mode (n_mode) with the mode for subtraction (Step S42).

Then, the ALU 22 can execute desired cumulative addition processing while performing the subtraction corresponding to the normalization coefficient for each piece of arithmetic result data in one data series, by repeatedly executing the next cumulative addition instruction (complex multiply and accumulation instruction) (Step S43).

In this case, the minimum value is subtracted from each piece of data. Therefore, there is a merit that the overflow can be prevented while maintaining relative differences between pieces of data.

Next, there will be described operations in a case of performing normalization shown in FIG. 16B (hereinafter, referred to as "normalization B").

The normalization B is processes to trace the maximum significant bit position of arithmetic result data upon cumulative addition operations such as synchronous processing and despreading, and then to subtract an arbitrary fixed value from each piece of arithmetic result data (input data for the next processing) when the traced bit position exceeds a predetermined threshold, thereby preventing the overflow.

In this case, the processor system 100 sets, upon the initial cumulative addition (multiply and accumulation) operation, the trace mode with the mode for detecting the maximum significant bit position.

The ALU 22 can store processing result data in the memory (local memory 102) while hiding the memory access latency for input and output data, and tracing the maximum significant bit position of processing result data (using the CR6 register), by executing desired cumulative addition instructions (CMAC) (Step S51).

As a result, the number of cycles in a for-loop for processing one data series becomes the one that is required for only repeating the same complex multiply and accumulation instruction (CMAC).

Next, the ALU 22 detects, by the complex Exponent instruction (CEXP), the maximum significant bit position from the traced result (value in the register CR6) obtained by the tracing, and compares, by a comparison instruction (CMP), the detected maximum significant bit position with the threshold (Step S52).

If the maximum significant bit position exceeds the threshold, an arbitrary fixed value is set to the normalization coefficient registers (n_value) in the memory controllers (LMC, SMC) 20 and 21, so that the normalization mode (n_mode) is set with the mode for subtraction.

Then, the ALU 22 can execute desired cumulative addition processing while performing the process to subtract the fixed value from each processing result data for one data series, by repeatedly executing the next cumulative addition instruction (complex multiply and accumulation instruction) (Step S53). Note that if the maximum significant bit position does not exceed the threshold, the cumulative addition is executed as it is without performing the normalization (subtraction).

In this case, an arbitrary fixed value is subtracted from each piece of data when the maximum value exceeds the threshold. Therefore, there is a merit that the overflow can be reliably prevented.

As described above, in this exemplary embodiment, it is possible by setting the trace mode (trace_mode) and the normalization mode (n_mode) to flexibly implement various normalization processes required in radio signal processing such as normalization for adjusting the dynamic range of input data, and various normalization processes for preventing the cumulative added value from overflowing. In particular, there is a significant merit that desired complex arithmetic processing can be executed while hiding the processing cycle overhead for normalization processes such as the normalization for input data, the memory access latency for input and output data, and the access latency for pilot data.

According to the above-mentioned first and second exemplary embodiments, the following advantageous effects can be expected.

The first advantageous effect is that it is possible to be flexibly and quickly compatible with various modulation/demodulation/synchronous processes (complex arithmetic processes) in a plurality of radio methods.

This is because in the processor system, the co-processor for complex arithmetic processing is connected to the typical processor for control, and thus various complex arithmetic processes such as the complex addition operation, the complex multiplication operation, and the complex multiply and accumulation operation can be executed at one instruction/cycle.

Further, one of the reasons for improving the flexibility is that the co-processor builds therein the memory controller for accessing the memory, and the memory controller includes the data FIFO to separate the co-processor arithmetic instruction for performing the complex arithmetic processing from the cycle for actually accessing the memory.

In particular, the independent address generator is included within the memory controller. Thus, it is possible to perform access in the order of various addresses (split transactions) upon the memory access for certain data series. Therefore, there are merits that it is not necessary for processor processing to calculate the address for each piece of data, and that it is possible to perform the memory access which has flexibility and can hide the access latency.

Further, the flexibility is also improved by the memory controller including both of the normal access function of updating its internal state by the amount corresponding to the register number for reading, and the PEEP function of not updating the internal state even when the data is read.

Furthermore, there is also a significant merit that it is possible to compatible without cycle overhead with various normalization processes in various radio methods, by using circuits for normalization such as the trace circuit and the preprocessing circuit according to the above-mentioned second exemplary embodiment.

This is because each of these trace circuit and preprocessing circuit includes the operation mode register, and based on the setting to the operation mode register, varies the trace function of detecting the maximum significant bit position, the minimum value and the like, and the preprocessing function for the arithmetic left-shifting, the subtraction and the like. Both of the trace circuit and the preprocessing circuit each of which can change the operation mode by the setting to the control register are provided, instead of providing only one of them. This (synergistic effect) makes it possible to more flexibly address normalization for various kinds of data (the calculation of normalization coefficient and the actual normalization).

The second advantageous effect is that it is possible to quickly perform modulation/demodulation (complex arithmetic processing) which also includes the memory access latency, even in the case of implementing it using the software processing by the processor with the emphasis on the flexibility. For example, it is possible to hide the latency for accessing pilot signals and the cycles for normalization processes.

This is because in the processor system, the co-processor dedicated for complex arithmetic processing is connected to the typical processor for control, and the memory controller, which builds therein the address generation function, the FIFO function and the preprocessing function capable of hiding the memory access latency, is provided for accessing the memory from the co-processor.

The use of such a memory controller makes it possible to separately and parallelly perform the modulation/demodulation (complex arithmetic processing) by the co-processor instruction and the memory access. Therefore, the memory access latency can be hidden, so that it is possible to perform the processing at quite high speed compared with the typical processor processing.

Further, one of reasons why the speeding-up can be accomplished is that as the ALU within the co-processor, there are provided the complex arithmetic units (the complex arithmetic unit and the complex arithmetic-logic unit) which can execute, at one instruction/cycle of processing throughput, various complex arithmetic processes such as the complex addition, the complex multiplication, the complex multiply and accumulation, the complex conjugate addition, the complex conjugate multiplication, and the complex conjugate multiply and accumulation.

The software processing by the typical processor takes about four cycles for a single complex multiplication (four multiplications), and takes about six processing cycles of the complex multiply and accumulation.

On the other hand, in the above-mentioned first and second exemplary embodiments, it is possible by use of co-processor processing instructions utilizing the ALU and the memory controller to implement various complex arithmetic processes at one complex data/cycle of processing throughput, for example.

Furthermore, in order to speed up the normalization, the trace circuit is provided in the ALU, and the preprocessing circuit for input data is provided in the memory controller. Thus, there is also a merit that it is possible to execute normalization processes (the calculation of normalization coefficient and the normalization of input data) in various radio communication methods without cycle overhead in parallel with normal complex arithmetic processes.

The typical processor processing takes at least one or more instructions of cycles for calculating the normalization coefficient for each piece of data, and also takes one or more instructions of cycles for the actual normalization for each piece of data. Therefore, there is a significant merit to implement various normalization processes in parallel without cycle overhead.

The principal advantageous effect according to the above-mentioned first and second exemplary embodiments is to simultaneously achieve both of the merit as the first advantageous effect of flexibility to compatible with a plurality of radio communication methods, and the merit as the second advantageous effect of speeding-up to implement modulation/demodulation (complex arithmetic processing) including the normalization at one data/cycle of processing throughput.

The reason comes from synergistic effects of realizing the following three matters.

The first one is that there are achieved the flexibility and high-speed performance of modulation/demodulation (complex arithmetic processing) itself including the normalization, by being equipped as the ALU with the complex arithmetic units which can perform various complex arithmetic processes and can process one piece of complex data at one cycle, and the trace circuit which can operate in parallel with the complex arithmetic units and to which parameters can also be set.

The second one is that the memory controller and the pilot data interface are provided on the premise of stream access which operates in parallel with and separately from the co-processor arithmetic processing, and thus it is possible to hide the memory access latency by the processor, which generally has difficulty in being speeded up. In terms of speeding up, it is also important that the preprocessing circuit in the memory controller can perform the normalization separately from the co-processor processing.

The third one is that in order that the processing overhead may not occur between the ALU and the memory controller or pilot generator which operate in parallel, there is provided the Wait control mechanism to prevent the processing at the co-processor's side from failing even when the FIFO for temporarily storing data becomes empty or full.

According to the above-mentioned three synergistic effects, it is possible to achieve both of the flexibility and the high-speed performance.

The third advantageous effect is that it is possible to implement various modulation/demodulation processes in a plurality of radio communication methods with lower power consumption, in other words, at higher power efficiency.

This is because in the above-mentioned first and second exemplary embodiments, while the ALU can perform at one cycle various complex arithmetic processes for one piece of complex data such as the complex addition, the complex subtraction, the complex multiplication, the complex multiply and accumulation, and the complex conjugate operations for them, the circuit configuration of ALU is materialized with the minimum necessary circuit configuration mostly for the complex multiply and accumulation. In other words, while enough flexibility is allowed to address typical complex arithmetic instructions, there is made the configuration with minimal dedicated arithmetic units, which is limited to one complex data/cycle of throughput, for example. Thus, it is possible to realize the processor system which has a better balance between processing performance and power consumption, and has higher power efficiency.

In a case of implementing all of a series of modulation/demodulation processes including the complex arithmetic processing with dedicated hardware configurations, there are required circuits for repeating data for respective processes. However, in the above-mentioned first and second exemplary embodiments, a loop circuit for-loop instruction, which is originally mounted on the processor for control, is used in common for processes to be repeated such as the for-loop. Therefore, there is also a merit that the circuits for repeat control are not necessary for the co-processor (they can be shared by normal instructions and modulation/demodulation instructions).

Further, there is also a merit in the present invention that it is possible to select overall system configurations depending on the trade-off like the FFT/IFFT processing, the despreading, the equalization, correlation and the pilot signal generation (pilot generator), the processing amounts of which are huge and therefore power efficiency would be raised if they are performed by hardware, are implemented by the dedicated hardware configuration, and other modulation/demodulation/synchronous processes are implemented by the processor for complex arithmetic processing with the emphasis on flexibility, so that the power efficiency can be improved.

Furthermore, the processor system and each dedicated hardware circuit can operate in parallel with each other. Therefore, there is also a merit that operations of the processor system and each dedicated hardware circuit at lower clock frequencies make it possible to achieve lower power consumption.

Finally, the fourth advantageous effect is that it is possible to flexibly address the future change or extension of specifications in various modulation/demodulation processes in a plurality of radio communication methods.

This is because the processor system is not configured by combining a processor for control and a dedicated hardware circuit, but is materialized by connecting the co-processor for complex arithmetic processing to the typical processor for control, so that it is possible by the software to designate the processing (instruction) in one cycle unit. In other words, there is a significant merit that the modification by the processor of software descriptions makes it possible to address a case where the processing algorithm, the processing order and the processing parameter are changed due to the change in specifications of modulation/demodulation in the existing radio communication method, a case where processing is added due to the extension of specifications, and the like.

Note that although the ALU portion is a dedicated circuit for complex arithmetic processing, the processing data unit, the loop count and the like in a series of modulation/demodulation processes are handled by the loop instruction (loop circuit) within the processor for control. Therefore, it is possible by the original function of the processor for control to address changes in such portions (the processing data unit, the loop count and the like).

Further, as described in the above-mentioned second exemplary embodiment, there are mounted the trace circuit (calculation of normalization coefficient) for processing result data and the preprocessing circuit for input data, which can address various normalization processes. Thus, there is also a merit that it is possible to flexibly address a case where new normalization processes are required for the extension or change of specifications.

Note that the present invention is not limited to the above-mentioned exemplary embodiments, and it will be understood by those of ordinary skill in the art that various changes in form and details may be made therein without departing from the spirit and scope of the present invention as defined by the claims.

This application is based upon and claims the benefit of priority from Japanese patent application No. 2011-029325, filed on Feb. 15, 2011, the disclosure of which is incorporated herein in its entirety by reference.

INDUSTRIAL APPLICABILITY

The present invention is applied to a co-processor for complex arithmetic processing and a processor system. In particular, the present invention is applied for the purpose of executing various complex arithmetic processes required for radio communication.

The whole or part of the exemplary embodiments disclosed above can be described as, but not limited to, the following supplementary notes.

(Supplementary Note 1)

A co-processor for complex arithmetic processing, comprising:

a complex arithmetic circuit that executes a complex arithmetic operation for complex data in accordance with an instruction from a primary processor, the complex arithmetic operation being required for radio communication; and a memory controller that operates in parallel with the complex arithmetic circuit, and accesses a memory, wherein the complex arithmetic circuit includes a trace circuit that monitors arithmetic result data for first complex data series sequentially read from the memory, and that detects a normalization coefficient for normalizing the arithmetic result data.

(Supplementary Note 2)

The co-processor for complex arithmetic processing according to Supplementary note 1, wherein the memory controller includes:

a first address generator circuit that autonomously generates a write address to the memory;

a second address generator circuit that autonomously generates read addresses from the memory;

a first FIFO (First-In First-Out) that temporarily stores the arithmetic result data, and that outputs the arithmetic result data to the memory in synchronization with the write address;

a second FIFO that temporarily stores complex data series input from the memory in synchronization with the read addresses, and that sequentially outputs the complex data series to the complex arithmetic circuit; and a preprocessing circuit that is provided between the memory and the second FIFO, and that normalizes, by using the normalization coefficient, the arithmetic result data input as second complex data series from the memory.

(Supplementary Note 3)

The co-processor for complex arithmetic processing according to Supplementary note 1 or 2, further comprising a register for storing pilot signal data, wherein the complex arithmetic circuit uses, for the complex arithmetic operation, pilot signal data series sequentially input through the register together with the first complex data series.

(Supplementary Note 4)

The co-processor for complex arithmetic processing according to any one of Supplementary notes 1 to 3, wherein the trace circuit includes:

an inverter circuit that inverts each of bit sequences respectively indicating a real part and an imaginary part of the arithmetic result data, when each of the bit sequences represents a negative number; and a cumulative OR circuit that performs a cumulative OR operation for data output from the inverter circuit, and that uses a result of the OR operation for detecting the normalization coefficient.

(Supplementary Note 5)

The co-processor for complex arithmetic processing according to Supplementary note 4, wherein the trace circuit further includes:

a detector circuit that detects a minimum value among the arithmetic result data; and a selector circuit that selects, in accordance with a preset mode, to use the result of the OR operation for detecting the normalization coefficient, or to detect the minimum value as the normalization coefficient.

(Supplementary Note 6)

The co-processor for complex arithmetic processing according to any one of Supplementary notes 1 to 3, wherein the trace circuit includes a detector circuit that detects, as the normalization coefficient, a minimum value among the arithmetic result data.

(Supplementary Note 7)

The co-processor for complex arithmetic processing according to Supplementary note 2, wherein the preprocessing circuit includes:

a shifter circuit that performs, as the normalization, shifting for the arithmetic result data; and a control register for setting an amount of the shifting in the shifter circuit.

(Supplementary Note 8)

The co-processor for complex arithmetic processing according to Supplementary note 7, wherein the preprocessing circuit includes:

a subtractor that performs, as the normalization, subtraction for the arithmetic result data; and a control register for setting an amount of the subtraction in the subtractor, and an operation mode indicating which one of the shifter circuit and the subtractor is to be operated.

(Supplementary Note 9)

The co-processor for complex arithmetic processing according to Supplementary note 2, wherein the preprocessing circuit includes:

a subtractor that performs, as the normalization, subtraction for the arithmetic result data; and a control register for setting an amount of the subtraction in the subtractor.

(Supplementary Note 10)

The co-processor for complex arithmetic processing according to any one of Supplementary notes 1 to 9, wherein the memory controller is configured:

to store, in first and second registers, one piece of complex data read from the memory;

to update the first and second registers with next complex data read from the memory when the complex arithmetic circuit obtains the one piece of complex data from the first register; and not to update the first and second registers when the complex arithmetic circuit obtains the one piece of complex data from the second register.

(Supplementary Note 11)

A co-processor for complex arithmetic processing, comprising:

a complex arithmetic circuit that executes a complex arithmetic operation for complex data in accordance with an instruction from a primary processor, the complex arithmetic operation being required for radio communication; and a memory controller that operates in parallel with the complex arithmetic circuit, and accesses a memory, wherein the memory controller includes:

a first address generator circuit that autonomously generates a write address to the memory;

a second address generator circuit that autonomously generates read addresses from the memory;

a first FIFO that temporarily stores arithmetic result data obtained by the complex arithmetic circuit, and that outputs the arithmetic result data to the memory in synchronization with the write address;

a second FIFO that temporarily stores complex data series input from the memory in synchronization with the read addresses, and that sequentially outputs the complex data series to the complex arithmetic circuit; and a preprocessing circuit that is provided between the memory and the second FIFO, and that normalizes the complex data series by using a predetermined normalization coefficient.

(Supplementary Note 12)

The co-processor for complex arithmetic processing according to Supplementary note 2 or 11, wherein each of the first and second address generator circuits includes:

an initial pointer register;

a step number register;

a memory length register; and an address arithmetic unit that sets a value in the initial pointer register as an initial value of an address pointer, and that sets, as a next address pointer every time the address is generated, a remainder obtained by dividing an additional value by a value in the memory length register, the additional value being obtained by adding the value of the address pointer to a value in the step number register.

(Supplementary Note 13)

A processor system comprising:

a co-processor for complex arithmetic processing according to any one of Supplementary notes 1 to 12; and

REFERENCE SIGNS LIST

10 PROCESSOR FOR CONTROL
11 CO-PROCESSOR FOR COMPLEX ARITHMETIC PROCESSING
12 MEMORY SELECTOR (MULTIPLEXER-TYPE BUS CONTROLLER)
13 PROCESSOR CONTROLLER
20 LOCAL MEMORY CONTROLLER
21 SHARED MEMORY CONTROLLER
22 ALU
23 REGISTER FILE
24 CONTROLLER
30 WRITE ADDRESS GENERATOR
31 WRITE DATA FIFO
40 READ ADDRESS GENERATOR
41 READ DATA FIFO
42, 43 PREPROCESSING CIRCUIT
50 COMPLEX ARITHMETIC UNIT
51 COMPLEX ARITHMETIC-LOGIC UNIT
60, 61 TRACE CIRCUIT
70 PILOT GENERATOR
100 PROCESSOR SYSTEM
101 INSTRUCTION MEMORY
102 LOCAL MEMORY (DATA MEMORY)
103 INTERFACE CONTROL CIRCUIT
104 FFT/IFFT PROCESSING ENGINE
105, 203 SHARED MEMORY
106 EQUALIZING ENGINE
200 MODEM MODULE
201 CPU
202 RESOURCE MANAGER
204 RF INTERFACE MODULE
205 SEARCH MODULE
206 CODEC MODULE

What is claimed is:

1. A co-processor for complex arithmetic processing, comprising:
a complex arithmetic circuit that executes a complex arithmetic operation for complex data in accordance with an instruction from a primary processor, the complex arithmetic operation being required for radio communication; and
a memory controller that operates in parallel with the complex arithmetic circuit, and accesses a memory,
wherein the memory controller includes:
a first address generator circuit that autonomously generates a write address to the memory;
a second address generator circuit that autonomously generates read addresses from the memory;
a first FIFO (First-In First-Out) that temporarily stores the arithmetic result data, and that outputs the arithmetic result data to the memory in synchronization with the write address;
a second FIFO that temporarily stores complex data series input from the memory in synchronization with the read addresses, and that sequentially outputs the complex data series to the complex arithmetic circuit; and
a preprocessing circuit that is provided between the memory and the second FIFO, and that normalizes, by using the normalization coefficient, the arithmetic result data input as second complex data series from the memory.

a primary processor that controls, by an instruction, the co-processor for complex arithmetic processing.

2. The co-processor for complex arithmetic processing according to claim 1,
wherein the complex arithmetic circuit includes a trace circuit that monitors arithmetic result data for first complex data series sequentially read from the memory, and that detects a normalization coefficient for normalizing the arithmetic result data.

3. The co-processor for complex arithmetic processing according to claim 1, further comprising a register for storing pilot signal data,
wherein the complex arithmetic circuit uses, for the complex arithmetic operation, pilot signal data series sequentially input through the register together with the first complex data series.

4. The co-processor for complex arithmetic processing according to claim 2, wherein the trace circuit includes:
an inverter circuit that inverts each of bit sequences respectively indicating a real part and an imaginary part of the arithmetic result data, when each of the bit sequences represents a negative number; and
a cumulative OR circuit that performs a cumulative OR operation for data output from the inverter circuit, and that uses a result of the OR operation for detecting the normalization coefficient.

5. The co-processor for complex arithmetic processing according to claim 4, wherein the trace circuit further includes:
a detector circuit that detects a minimum value among the arithmetic result data; and
a selector circuit that selects, in accordance with a preset mode, to use the result of the OR operation for detecting the normalization coefficient, or to detect the minimum value as the normalization coefficient.

6. The co-processor for complex arithmetic processing according to claim 2, wherein the preprocessing circuit includes:
a shifter circuit that performs, as the normalization, shifting for the arithmetic result data; and
a control register for setting an amount of the shifting in the shifter circuit.

7. The co-processor for complex arithmetic processing according to claim 6, wherein the preprocessing circuit includes:
a subtractor that performs, as the normalization, subtraction for the arithmetic result data; and
a control register for setting an amount of the subtraction in the subtractor, and an operation mode indicating which one of the shifter circuit and the subtractor is to be operated.

8. The co-processor for complex arithmetic processing according to claim 1, wherein the memory controller is configured:
to store, in first and second registers, one piece of complex data read from the memory;
to update the first and second registers with next complex data read from the memory when the complex arithmetic circuit obtains the one piece of complex data from the first register; and
not to update the first and second registers when the complex arithmetic circuit obtains the one piece of complex data from the second register.

9. A co-processor for complex arithmetic processing, comprising:
a complex arithmetic circuit that executes a complex arithmetic operation for complex data in accordance with an instruction from a primary processor, the complex arithmetic operation being required for radio communication; and a memory controller that operates in parallel with the complex arithmetic circuit, and accesses a memory, wherein the memory controller includes:

a first address generator circuit that autonomously generates a write address to the memory;

a second address generator circuit that autonomously generates read addresses from the memory;

a first FIFO that temporarily stores arithmetic result data obtained by the complex arithmetic circuit, and that outputs the arithmetic result data to the memory in synchronization with the write address;

a second FIFO that temporarily stores complex data series input from the memory in synchronization with the read addresses, and that sequentially outputs the complex data series to the complex arithmetic circuit; and a preprocessing circuit that is provided between the memory and the second FIFO, and that normalizes the complex data series by using a predetermined normalization coefficient.

10. A processor system comprising:

co-processor for complex arithmetic processing according to claim 1; and the primary processor that controls, by an instruction, the co-processor for complex arithmetic processing.

* * * * *